United States Patent
Muramatsu

(10) Patent No.: US 6,863,218 B2
(45) Date of Patent: Mar. 8, 2005

(54) TWO-DIMENSIONAL CODE READING APPARATUS, TWO-DIMENSIONAL CODE READING PROCESS, TWO-DIMENSIONAL CODE READING PROGRAM AND RECORDING MEDIUM FOR SAID PROGRAM, PORTABLE TERMINAL AND DIGITAL CAMERA

(75) Inventor: Takeharu Muramatsu, Chiba (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 10/621,887

(22) Filed: Jul. 18, 2003

(65) Prior Publication Data
US 2004/0020989 A1 Feb. 5, 2004

(30) Foreign Application Priority Data
Jul. 18, 2002 (JP) ........................................ 2002-210302

(51) Int. Cl.[7] ............................................. G02B 26/10
(52) U.S. Cl. ............................. 235/462.25; 235/462.01; 235/462.1; 235/462.09; 235/462.08; 235/494; 235/487
(58) Field of Search ........................ 235/462.25, 462.01, 235/462.08, 462.09, 462.1, 487, 494

(56) References Cited

U.S. PATENT DOCUMENTS

| | | | | |
|---|---|---|---|---|
| 5,276,315 A | * | 1/1994 | Surka | 235/462.1 |
| 5,686,718 A | * | 11/1997 | Iwai et al. | 235/494 |
| 5,866,895 A | * | 2/1999 | Fukuda et al. | 230/494 |
| 6,267,296 B1 | * | 7/2001 | Ooshima et al. | 235/487 |
| 6,612,497 B1 | * | 9/2003 | Iida et al. | 235/462.25 |
| 6,685,095 B2 | * | 2/2004 | Roustaei et al. | 235/472.01 |

FOREIGN PATENT DOCUMENTS

| | | |
|---|---|---|
| EP | 0 999 519 A1 | 5/2000 |
| JP | 10-187868 A | 7/1998 |
| JP | 2000-172777 A | 6/2000 |

* cited by examiner

*Primary Examiner*—Michael G. Lee
*Assistant Examiner*—Steven S. Paik
(74) *Attorney, Agent, or Firm*—Birch, Stewart, Kolasch & Birch, LLP.

(57) ABSTRACT

When a two-dimensional code having data cells (referred to as DC) comprising two-dimensional data, positioning finder patterns (referred to as FP) and an alignment pattern (referred to as AP) is input, the positions of FP are detected by evaluating the proximity from patterns in three horizontal, vertical and inclined directions. The position of AP is detected by conducting the template matching after the rotation correction of part of the input image. The version of the code is determined by calculation of the number of cells from the widths and positions of FP. Coordinate conversion expressions for converting the positions of DC into their coordinate positions based upon the positions of FP and AP and the version are determined and DC are cut out. The array of the cut out DC is decoded for reading the two-dimensional code.

41 Claims, 16 Drawing Sheets

DIRECTION 0

DIRECTION 1

DIRECTION 2

DIRECTION 3

FIG.10

| CANDIDATE NO. | x COORDINATE | y COORDINATE | WIDTH | EVALUATION VALUE |
|---|---|---|---|---|
| 0 | 52 | 215 | 34 | 14 |
| 1 | 52 | 215 | 34 | 14 |
| 2 | 95 | 197 | 39 | 8 |
| 3 | 95 | 197 | 33 | 8 |
| 4 | 95 | 197 | 22 | 12 |
| 5 | 172 | 88 | 30 | 14 |
| 6 | 173 | 88 | 33 | 14 |
| 7 | 175 | 212 | 32 | 12 |
| 8 | 175 | 212 | 32 | 15 |

FIG.11

| CANDIDATE NO. | x COORDINATE | y COORDINATE | WIDTH | EVALUATION VALUE |
|---|---|---|---|---|
| 0 | 52 | 215 | 34 | 28 |
| 1 |  |  |  |  |
| 2 | 95 | 197 | 36 | 16 |
| 3 |  |  |  |  |
| 4 | 95 | 197 | 22 | 12 |
| 5 | 172.5 | 88 | 31.5 | 28 |
| 6 |  |  |  |  |
| 7 | 175 | 212 | 32 | 27 |
| 8 |  |  |  |  |

CANDIDATE i (xi, yi)
CANDIDATE j (xj, yj)

$\frac{3}{14}$ w

FIG.14

|         | AREA 0      | AREA 1      | AREA 2      | AREA 3      |
|---------|-------------|-------------|-------------|-------------|
| AREA 0  | -           | DIRECTION 0 | -           | DIRECTION 3 |
| AREA 1  | DIRECTION 0 | -           | DIRECTION 1 | -           |
| AREA 2  | -           | DIRECTION 1 | -           | DIRECTION 2 |
| AREA 3  | DIRECTION 3 | -           | DIRECTION 2 | -           |

FIG.15

|             | AREA 0 | AREA 1 | AREA 2 | AREA 3 |
|-------------|--------|--------|--------|--------|
| DIRECTION 0 | F1     | F2     |        |        |
| DIRECTION 1 |        | F1     | F2     |        |
| DIRECTION 2 |        |        | F1     | F2     |
| DIRECTION 3 | F2     |        |        | F1     |

TWO-DIMENSIONAL CODE READING APPARATUS, TWO-DIMENSIONAL CODE READING PROCESS, TWO-DIMENSIONAL CODE READING PROGRAM AND RECORDING MEDIUM FOR SAID PROGRAM, PORTABLE TERMINAL AND DIGITAL CAMERA

The present application claims priority under 35 U.S.C. §119 to Japanese Patent Application No. 2002-210302, filed Jul. 18, 2002, the entire disclosure of which is hereby incorporated by reference.

BACKGROUND OF THE INVENTION

The present invention relates to a two-dimensional code reading apparatus, two-dimensional code reading process, two-dimensional code reading program, recording medium for said program, portable terminal and digital camera, and in particular to a two-dimensional code reading apparatus, two-dimensional code reading process, two-dimensional code reading program and recording medium for said program, which enables, for example, a portable terminal having a built-in camera to easily read two-dimensional codes.

Portable cellular phones having built-in cameras have recently been becoming popular. If information which is recorded in two-dimensional code is read by picking up the images of the two-dimensional code by means of a camera which is incorporated in such a portable cellular phone, it is necessary to make it possible to read the two-dimensional code by a technique having a comparatively less processing capacity in view of the processing capacity since usual portable cellular phones have a low processing capacity.

Examples of two-dimensional code include two-dimensional code, that is QR code (Quick Response Code) which is prescribed by JISX510 (and ISO/IEC 18004). FIG. 1 is a schematic view showing an exemplary configuration of QR code. As shown in FIG. 1, the two-dimensional QR code which is in the shape of square is configured so that the position of QR code can be detected. A specific first pattern (finder pattern F) comprising squares having different size proportions is disposed at each of three corners of the two-dimensional code. A reference pattern (timing pattern T) comprising black and white cells which are alternately arrayed in a lateral and vertical directions is disposed among the three finder pattern F. The timing pattern T is an index of the position of each data cell of the two-dimensional code. A specific second pattern (alignment pattern P) is disposed on the two-dimensional code, which makes it possible to conduct alignment of the positions of the data cells of the two-dimensional code even if the two-dimensional code is imaged in a obliquely distorted manner.

The inner area of the QR code is divided into m by m square areas (hereinafter referred to as "cells"). Binary data which is light (white) and dark (black) cell can be recorded in each cell. The finder pattern is a figure comprising a black square having sides, the length of each of which corresponds to seven cells, a white square having sides, the length of each of which corresponds to five cells and a black square having sides, the length of each of which corresponds to three cells which are concentrically superposed in a radial outward direction.

The image of the thus formed QR code is read by means of image sensor and is input into two-dimensional code reading apparatus. The image which is input to the two-dimensional code reading apparatus is converted into two-value, or binary image having any of two values such as light (white) and dark (black). In such a manner reading of the two-dimensional code is accomplished for the binary image.

The two-dimensional code is configured so that ratio of appearances of black:white:black:white:black cells in the finder pattern F when the binary image is linearly scanned in a lateral or vertical direction in the vicinity of the center of the finder pattern F having the above-mentioned size is 1:1:3:1:1. By using the ratio of appearance of the pattern having such ratio, the position of the finder pattern F can be detected from the binary image which has been input from the image sensor and converted into binary data.

If the finder pattern F which is positioned at the opposite ends of the timing pattern T is detected, the timing pattern T can be detected by detecting the position at which black and white cells alternately appear at a ratio of 1:1 from the end of the finder pattern F.

If the image of the QR code is picked up obliquely, a distortion of the picked up image depending upon the imaging direction occurs in comparison to the image which is picked up in a normal direction with respect to the QR code. In order to make it possible to correctly determine the cell position of the QR code for the distorted image, the alignment pattern P comprising specific second pattern is disposed in a given position in the two-dimensional code, different from that of the finder pattern F with reference to the finder pattern F.

The two-dimensional code is configured so that the coordinates of the alignment pattern P which is expected to be disposed can be calculated from the coordinates of the centers of the three finder patterns F. By examining the binary image consecutively in detail based upon the result of the calculation to extract a partial pattern comprising a shape matching with the feature of the second pattern which is specific to the alignment pattern P, the position of the alignment pattern P can be detected.

The coordinates of the position of the center of each data cell in which data is recorded can be calculated from each coordinate at which respective positions of the finder patterns F, timing pattern T and alignment pattern P is detected. An example will be described with reference to FIG. 2 showing the manner of conventional data cutting out.

FIG. 2 is a schematic view showing the prior art which calculates the coordinates of the center of data cell in the QR code. In FIG. 2, the centers of the finder patterns F are represented as Fa, Fb and Fc and the center of the alignment pattern P is represented as Pd. Firstly, a straight line S1 which connects point Fb with point Fb and a straight line S4 which connects point Fa with point Fc are determined.

A point Fb' to which the point Fb has been moved by three cells in a horizontal direction (lateral direction) and in a leftward direction (that is, in a direction toward the point Fa) on the straight line S1 is determined. Then, a point Fc' to which the point Fc which has been moved by three cells in a vertical direction and in an upward direction (that is, in a direction toward the point Fa) on the straight line S1 is determined.

A straight line S3 which connects the moved point Fb' with the center point Pd of the alignment pattern P is determined and a straight line S2 which connects the moved point Fc' with the center point Pd of the alignment pattern P is determined.

The coordinates of the center of each cell in the position which is designated by a mark E in FIG. 2 is found from the center points Fa and Fb of the finder patterns F which are disposed in a horizontal (lateral) direction and the timing pattern T which is disposed therebetween.

Further, the inclination of a straight line (for example, a dotted line Hs is shown in FIG. 2) which is a horizontal reference, passing through the center of each cell represented by mark E can be calculated from the inclinations of the lines S4 and S3, so that a horizontal reference line Hs passing through the center of each of cells represented by mark E can be determined.

Similarly, vertical reference lines Vs can be also determined. The position in which thus determined horizontal reference line Hs intersects with vertical reference line Vs can be calculated as the coordinates of the center of each data cell.

The appearance frequency of black and white cells is sequentially checked towards the peripheral of the data cells from the thus calculated coordinates of the centers of the cells and the number of the white pixels in the cell is compared with that of the black pixels, so that more pixels are determined as data value of the data cells in interest.

When the position of the QR code which is a two-dimensional code is to be identified, it is necessary to determine whether or not the ratio of the black:white:black-:white:black pattern of cells is 1:1:3:1:1 in order to detect the finder pattern F. However, if the image in which the two-dimensional code (QR code) is rotated or tilted is picked up, said ratio for detecting the finder pattern F may not exactly match said ratio of 1:1:3:1:1 even if the appearance frequency is tried to determine only in a horizontal or vertical direction. A case may occur in which the detected ratio matches said ratio 1:1:3:1:1 in a position other than the position in which actual finder pattern F exists. The position of the finder pattern F may be incorrectly detected.

If the timing pattern T is detected and is used in order to determine the positions of data cells, there is a problem that an extended period of time is required to detect the timing pattern T in which white and black cells alternately appear between the finder patterns F which are positioned at three corner of the two-dimensional code (QR code). This problem becomes more serious as the version of the two-dimensional code (QR code) become newer (more number of pixels forming the two-dimensional code).

The alignment pattern P is detected by calculating expected coordinates at which it is expected that the alignment pattern P exists from the coordinates of the finder pattern F and by examining the peripherals in detail. Since the expected coordinates may largely deviate from the coordinates in which actual alignment pattern P exists due to the distortion of the picked up image, a great deal of time would be required to conduct examination to detect exact position in which the actual alignment pattern P exists.

Precise examination of the alignment pattern P of the two-dimensional code (QR code) is conducted for the binary image which has been subjected to binary processing. Crushing of white pixels and chipping of black pixels may occur due to an error which is caused by conversion into binary data. A problem may occur in which the alignment pattern P is incorrectly detected by the influence of such crushing or chipping.

The two-dimensional code (QR code) having the cells which is large in number to some extent can be formed in such a manner that a plurality of alignment patterns P are disposed and the data cells can be stably cut out from the two-dimensional data (i.e. the data value of each data cell can be determined) by detecting any of a plurality of alignment patterns P even through the pick up image is slightly distorted. In this case, it is necessary to detect the position of a plurality of alignment patterns P, so that an extended period of time is taken to complete processing.

Since the data values of data cells are determined (i.e. the data cells are cut out) by checking the numbers of the black and white pixels within a specified range based upon the dimensions of the cell, i.e. the cell size, an extended period of time is not only required to determine the data values of the data cells, but also crushing of white pixels and chipping of black pixels is liable to occur due to an error in binary processing (binarization), so that the data values of the data cells is liable to be erroneous.

An error may occur due to distortion of the input image when the version of said two-dimensional code (QR code) is determined by calculating the number of cells from the distance between the finder patterns F. Accordingly, correct version of the code can not be determined, so that reading of the two-dimensional code fails.

SUMMARY OF THE INVENTION

The present invention has a purpose to contemplate to positively identifying the positions of the finder pattern by detecting the positions of the finder patterns disposed in predetermined plural positions based upon the results of scanning of the input image having recorded two-dimension code thereon in a plurality of directions (for example, three directions, that is, horizontal, vertical and inclined directions) and by conducting the detection based upon the features of the finder patterns using an evaluation value representative of the approximation between the detected finder pattern and the first pattern specific to the finder pattern and an acceptable value of the difference between the width of the detected finder pattern and the width which is predetermined as the finder pattern.

Accordingly, when the finder patterns are to be detected, evaluation values representative of how the ratio of the first patterns specific to the finder patterns, for example, black-:white:black:white:black pattern of cells is approximate to the ratio of 1:1:3:1:1. The detection precision of the finder pattern can be enhanced by comparing the evaluation values concerning the whole of the input image. Thus, the present invention contemplates to make it possible to detect the finder patterns from even the input image having a comparatively low resolution and noise.

Alternatively, scanning of the finder pattern for determining whether or not the pattern to be detected is approximate to the first pattern specific to the finder pattern is conducted totally three times in horizontal, vertical and inclined directions. The invention contemplates to-enhance the detection precision of the finder pattern by using the evaluation value concerning the ratios of patterns in respective directions even if the two-dimension code is angularly rotated in the input image.

The invention further has a purpose to contemplate to positively detect the positions of the alignment patterns by conducting a process comprising the steps of determining a retrieval reference point, with reference to which the range of the retrieval of the alignment pattern is specified from the inclination of each side of the two-dimensional code which is detected from the inclination of the outer contour of the finder pattern in the input image obtained by scanning the outer contour of the finder pattern and the coordinates of the center of the finder pattern; cutting out partial image within the retrieval range, which is located in a predetermined position relative to the determined retrieval reference point, away from the input image prior to the binarization; extracting an alignment pattern from said partial image by conducting a template matching between said cut out partial image and a template which matches a feature of a second pattern specific to said alignment pattern, whereby to positively detect the position of said alignment pattern; and applying the correction of the rotation to the detected position depending upon the rotational angle if the two-dimensional data is angularly rotated.

Hence, the inclination of the side of the two-dimensional code, part of which is formed by the outer contour of the finder pattern is determined by detecting the inclination of the outer contour of the finder pattern by scanning it. Expected coordinates of the alignment pattern is determined by determining the intersection of straight lines which are parallel with said sides of the two-dimensional codes and pass through the centers of said finder patterns. The present invention contemplates to detect with a high precision the alignment pattern by conducting a template matching between the detected alignment pattern and the template which matches the feature of the alignment pattern using the input image prior to binarization. Even if the two-dimensional code exists with being distorted, the retrieval range in which the alignment pattern may exist can be accurately determined. The present invention makes it possible to reduce the amount of processing which is required to examine the input image for retrieving the alignment pattern as is done in the prior art, resulting in that saving of the whole processing amount which is necessary to detect the position of the alignment pattern.

The present invention also has a purpose to contemplate to cutting out data cells by process comprising the steps of converting the positions of the center of each data cell into its coordinates in the input image by using coordinate conversion expressions to which conversion coefficients applied, said conversion coefficients being calculated based upon the positions of the detected finder patterns and alignment pattern and based upon the number of cells of the two-dimensional code which is determined by the determined version; and comparing the density which is obtained from the value of the pixel located in the coordinate in said input image corresponding to each data cell, or the density which is obtained by interpolating the values of peripheral pixels which are adjacent to said coordinates with a light and dark threshold which is preset for identifying the value of each data cell, whereby to determine the data value of each data cell for properly conducting the cutting out of the data cells. If reading of said two-dimensional code fails due to inappropriate cutting out of data cells, the version which has been determined in version determination step is changed by one, the processing for cutting out of the data cells is repeated again, so that failure of the reading of the two-dimensional code due to misdetermination of version is prevented.

The present invention as described above may not be provided with a timing pattern in two-dimensional code unlike the prior art, so that necessity of detection of the timing pattern is not omitted. The positions of the centers of data cells are determined from four pairs of coordinates such as those of three finder patterns and one alignment pattern by using coordinate conversion expressions. The data values of data cells can be determined by the density of the input image in determined cell position, so that the period of time which is necessary for timing pattern detecting processing is reduced and the period of time which is necessary to determine the data values of data cells is reduced. Therefore, the amount of the whole of the data cell cutting out processing can be remarkably reduced.

The present invention as described above estimates the value of the pixel which is located in the center of the cell by interpolating the values of pixels adjacent to the center of the cell even if no pixel exist in the input image in a position corresponding to the center of the data cell. The value of the data cell is determined by comparing the estimated value of the pixel with a black and dark threshold which is preliminarily determined base upon the values of a plurality of pixels located in specified positions within the two-dimensional code in which data cells are disposed. Even if cutting out of data cells can not be conducted, so that reading of the two-dimensional code fails, the version which is determined based upon the width of the finder patterns and the spacing therebetween is changed by one (for example, increased by one). Reading of the two-dimensional code and processing of the cutting out of data cells is repeated again, for reducing the influence of misdetermination of the version.

The present invention has a purpose that a two-dimensional code reading apparatus for reading from an input image a two-dimensional code which is representative of various items of information by arranging in a two-dimensional form such as in a horizontal and vertical direction data cells each recording binary data thereon, and which is wherein said two-dimensional code comprises finder patterns each having a specific first pattern, which are disposed in a plurality of predetermined positions within said two-dimensional code for identifying the position of said two-dimensional code within said input image and an alignment pattern which is disposed in a predetermined position different from those of the finder patterns within said two-dimensional code, said alignment pattern having a second pattern which is different from the first pattern specific to said finder pattern, in that processing for detecting the positions of said plurality of finder patterns which are disposed in the plurality of predetermined positions from said input image is conducted based upon a result of scanning of said input image in a plurality of directions; in that processing for detecting the position of said alignment pattern is conducted based upon the detected said finder patterns; in that processing for determining the version of said two-dimensional code which defines the number of cells constituting said two-dimensional code is conducted based upon said detected finder patterns; in that processing for cutting out the data cells which define the data value of each of data cells constituting said two-dimensional code is conducted based upon the positions of said detected finder patterns and said alignment pattern and said version which is determined by said version determining process; and in that a decoding processing for identifying the information of said two-dimensional code is conducted in accordance with a predetermined rule from the data values of data cells which are determined by said data cell cutting out processing.

The present invention has a purpose that a two-dimensional code reading apparatus is wherein a plurality of candidates of the finder patterns having a pattern which is approximate to said finder patterns comprising said black and white specific first patterns are extracted from said input image as candidate finder patterns, in that the constitutional ratio of the black and white patterns along a scanning line across each candidate finder pattern in three directions such as horizontal, vertical and inclined directions is detected for each of said plurality of extracted candidate finder patterns, in that the detected constitutional ratio of the black and white pattern in each direction is compared with that of said specific first pattern comprising black and white patterns which is predetermined as said finder pattern to calculate an evaluation value representative of the approximation between the candidate pattern and said first pattern, and in that a predetermined number of said candidate finder patterns are selected from among said extracted plurality of candidate finder patterns in order from the candidate finder pattern having higher proximity which is represented by said evaluation value, so that respective positions of the predetermined number of selected finder patterns are detected.

The present invention has a purpose that a two-dimensional code reading apparatus is wherein if said evaluation value representative of the approximation between said candidate finder pattern and said first pattern specific to said finder pattern in any of horizontal, vertical and inclined directions of said extracted plurality of candidate finder patterns is calculated as a value exceeding a predetermined threshold so that the candidate pattern is not approximate to said first pattern, said candidate finder pattern is excluded from the candidates of said finder patterns.

The present invention has a purpose that a two-dimensional code reading apparatus is wherein said threshold can be preliminarily preset to a desired value by a user depending upon the type and application of said two-dimensional code, and/or quality of input image.

The present invention has a purpose that a two-dimensional code reading apparatus is wherein if said candidate finder patterns which are disposed in such positions that they are superposed in proximity are extracted, said candidate finder patterns which are in superposing positions are unified and said evaluation values of respective candidate finder patterns prior to unification are summed so that the sum is represent as the evaluation value of the unified candidate finder patterns.

The present invention has a purpose that a two-dimensional code reading apparatus is wherein if the difference between the width representative of the size of said extracted candidate finder patterns and the predetermined specific width representative of the size of said finder pattern in any of horizontal, vertical and inclined directions exceeds a predetermined acceptable value, said candidate finder pattern is excluded from the candidates of said finder patterns.

The present invention has a purpose that a two-dimensional code reading apparatus is wherein said acceptable value can be preliminarily set to a desired value by a user depending upon the type and application of said two-dimensional code, and/or quality of input image.

The present invention has a purpose that a two-dimensional code reading apparatus is wherein an average of the widths of said finder pattern in three directions such as horizontal, vertical and inclined directions is used as the width representative of the size of the detected finder pattern.

The present invention has a purpose that a two-dimensional code reading apparatus is wherein the cell size representative of the dimensions of the cells constituting said two-dimensional code is determined based upon the width representative of the size of the detected finder pattern.

The present invention has a purpose that a two-dimensional code reading apparatus is wherein the version of said two-dimensional code is determined by calculating the number of cells which constitute said two-dimensional code based upon the spacing between said detected plurality of finder patterns and the cell size representative of the dimensions of the cells derived from the width representative of the size of said finder pattern.

The present invention has a purpose that a two-dimensional code reading apparatus is wherein said apparatus comprises a version registration table showing the correspondence between the version of the two-dimensional code and the number of the registered cell constituting the two-dimensional code which is determined by the-version and that said version registration table is retrieved based upon the calculated number of cells, whereby the number of said registered cells having matched or approximate value and the version corresponding to said number of registered cells is determined as the number of cells which constitute the two-dimensional code and its version, respectively.

The present invention has a purpose that a two-dimensional code reading apparatus is wherein a determination whether or not the orientation of the two-dimensional code is angularly rotated in the input image is made based upon respective coordinates of the detected plurality of finder patterns and in that if it is determined that it is rotated, then the rotational angle of the two-dimensional code is calculated.

The present invention has a purpose that a two-dimensional code reading apparatus is wherein the presence of the inclination of each side of said two-dimensional code in the input image is detected by detecting the presence of the inclination of said finder patterns in said input image, in that a retrieval reference point with reference to which the range of the retrieval for retrieving said alignment pattern in said input image is designated is determined from the inclination of each side and the coordinates of the centers of said finder patterns, and in that partial image in the retrieval range which is located in predetermined position from the determined retrieval reference point is cut out from said input image and in that the position of said alignment pattern is detected by extracting said alignment pattern comprising said second pattern from said part of the image.

The present invention has a purpose that a two-dimensional code reading apparatus is wherein the presence of the inclination of said finder pattern is detected by detecting the coordinates of at least two pixels among the coordinates of the pixels which form part of the side of said two-dimensional code on which said finder pattern is located and form the outer contour of said finder pattern by scanning the pixels of said finder pattern.

The present invention has a purpose that a two-dimensional code reading apparatus is wherein a point of intersection of a straight line passing through the coordinates of the center of said finder pattern forming part of the side of said two-dimensional code and parallel with said side of said two-dimensional code and a straight line passing through the coordinates of the center of the other finder pattern which is diagonally opposite to said finder pattern within said two-dimensional code and forms part of the other side of said two-dimensional code and is parallel with said other side is determined as said retrieval reference point, with reference to which said retrieval range for retrieving said alignment pattern is specified.

The present invention has a purpose that a two-dimensional code reading apparatus is wherein said retrieval range is an area which is so wide to include said second pattern specific to said alignment pattern with a margin of at least two-cell size from an estimated central coordinates at which the location of center of said alignment pattern is estimated as being remote from said retrieval reference point by a predetermined distance.

The present invention has a purpose that a two-dimensional code reading apparatus is wherein there is provided a template which matches a feature of each pixel which said second pattern specific to said alignment pattern and in that said alignment pattern comprising said second pattern is extracted from said partial image by conducting template matching between said template and said partial image while shifting by one pixel.

The present invention has a purpose that a two-dimensional code reading apparatus is wherein if the orientation of said two-dimensional code is angularly rotated in said input image, partial image within said retrieval range which is specified by applying the coordinates of said retrieval reference point to the rotational correction based upon the angle at which said orientation of said two-dimensional code is rotated is cut out from said input image and in that after applying the rotation correction for the cut out partial image based upon said rotational angle, the position of said alignment pattern is detected by conducting said template matching while shifting said rotation corrected partial image by one pixel for extracting said alignment pattern.

The present invention has a purpose that a two-dimensional code reading apparatus is wherein said partial image which is to be processed for said template matching is the partial image which is cut out from said input image which is under a condition prior to binary processing.

The present invention has a purpose that a two-dimensional code reading apparatus is wherein when processing for said template matching is conducted, the sum of the absolute values of difference between the pixel value of the pixels of said template and the pixel value of corresponding pixels of said partial image is calculated while sequentially shifting said partial image by one pixel, whereby the position within said partial image in which the sum of absolute values becomes a minimum is determined as the coordinates of said alignment pattern.

The present invention has a purpose that a two-dimensional code reading apparatus is wherein when processing for cutting out said data cells to determine the data value of each data cell which forms said two-dimensional code is conducted, conversion coefficients of coordinate conversion expressions. for converting the position of the center of each data cell of said two-dimensional code into the coordinates in said input image based upon the cell positions of the centers of said finder patterns and said alignment pattern, which are detected by a position identifying process of said data cell and based upon the number of cells of said two-dimensional code which is determined by the identified version, in that the center position of each data cell is converted into the coordinates of said input image by using said coordinate conversion expressions to which the calculated conversion coefficients are applied for identifying the coordinates corresponding to the center position of each data cell, and in that a data value of each data cell is determined based upon the density of the coordinate position which is identified by said position identifying process for conducting cutting out of each data cell.

The present invention has a purpose that a two-dimensional code reading apparatus is wherein when a process for cutting out said data cells to determine the data value of each data cell which forms said two-dimensional code, the density of said input image at coordinates corresponding to the position of the center of the data cell which is identified by said position identifying process is the density which is obtained from the pixel value of the pixel existing at said coordinates if a pixel exists at the coordinates in said input image corresponding to the position of the center of the identified data cell and it is the density which is obtained by interpolation of pixel values of peripheral pixels adjacent to said coordinates if a pixel does not exist at the coordinates in said input image corresponding to the position of the center of the identified data cell, and in that the data value of each data cell is determined by comparing said density of the input image at the coordinates corresponding to the position of the center of each data cell with a light and dark threshold for identifying the data value of each data cell.

The present invention has a purpose that a two-dimensional code reading apparatus is wherein said light and dark threshold for identifying the data value of each data cell is set based upon the pixel values of the pixels in said input image which are located along the diagonal of said two-dimensional code.

The present invention has a purpose that a two-dimensional code reading apparatus is wherein said light and dark threshold is set to an intermediate value between the maximum and minimum of pixel values of all pixels in said input image which are located along the diagonal of said two-dimensional code.

The present invention has a purpose that a two-dimensional code reading apparatus is wherein if cutting out of said data cells is not properly conducted so that reading of said two-dimensional code fails, a process for cutting out said data cells is repeated again after changing by one version which is determined by said version determining step.

The present invention has a purpose that a potable terminal built in a camera is wherein said portable terminal comprises a two-dimensional code reading apparatus as described above.

The present invention has a purpose that a digital camera is wherein said digital camera comprises a two-dimensional code reading apparatus as described above.

The present invention has a purpose that a two-dimensional code reading process for reading from an input image a two-dimensional code which is representative of various items of information by arranging in a two-dimensional form such as in a horizontal and vertical direction data cells each recording binary data thereon, and which is wherein said two-dimensional code comprises finder patterns each having a specific first pattern, which are disposed in a plurality of predetermined positions within said two-dimensional code for identifying the position of said two-dimensional code within said input image and an alignment pattern which is disposed in a predetermined position different from those of the finder patterns within said two-dimensional code, said alignment pattern having a second pattern which is different from the first pattern specific to said finder patterns, in that a processing for detecting the positions of said plurality of finder patterns which are disposed in the plurality of predetermined positions from said input image is conducted based upon a result of scanning of said input image in a plurality of directions; in that processing for detecting the position of said alignment pattern is conducted based upon the detected said finder patterns; in that processing for determining the version of said two-dimensional code which defines the number of cell constituting said two-dimensional code is conducted based upon said detected finder patterns; in that processing for cutting out the data cells which define a data value of each of data cells constituting said two-dimensional code is conducted based upon the positions of said detected finder patterns and said alignment pattern and said version which is determined by said version determining process; and in that decoding processing for identifying the information of said two-dimensional code is conducted in accordance with a predetermined rule from the data values of data cells which are determined by said data cell cutting out processing.

The present invention has a purpose that a two-dimensional code reading process is wherein a plurality of candidates of the finder patterns having a pattern which is approximate to said finder patterns comprising said black and white specific first patterns are extracted from said input image as candidate finder patterns, in that the constitutional ratio of the black and white patterns along a scanning line across each candidate finder pattern in three directions such as horizontal, vertical and inclined directions is detected for each of said plurality of extracted candidate finder patterns, in that the detected constitutional ratio of the black and white pattern in each direction is compared with that of said specific first pattern comprising black and white patterns which is predetermined as said finder pattern to calculate an evaluation value representative of the approximation between the candidate pattern and said first pattern, and in that a predetermined number of said candidate finder patterns are selected from among said extracted plurality of candidate finder patterns in order from the candidate finder pattern having higher proximity which is represented by said evaluation value, so that respective positions of the predetermined number of selected finder patterns are detected.

The present invention has a purpose that a two-dimensional code reading process is wherein the version of said two-dimensional code is determined by calculating the number of cells which constitute said two-dimensional code based upon the spacing between said detected plurality of finder patterns and the cell size representative of the dimensions of the cells derived from the width representative of the size of said finder pattern.

The present invention has a purpose that a two-dimensional code reading process is wherein the presence of the inclination of each side of said two-dimensional code in the input image is detected by detecting the presence of the inclination of said finder patterns in said input image, in that a retrieval reference point with reference to which the range of the retrieval for retrieving said alignment pattern in said input image is designated is determined from the inclination of each side and the coordinates of the centers of said finder patterns, and in that partial image in the retrieval range which is located in predetermined position from the determined retrieval reference point is cut out from said input image and in that the position of said alignment pattern is detected by extracting said alignment pattern comprising said second pattern from said part of the image.

The present invention has a purpose that a two-dimensional code reading process is wherein there is provided a template which matches a feature of each pixel which said second pattern specific to said alignment pattern and in that said alignment pattern comprising said second pattern is extracted from said partial image by conducting template matching between said template and said partial image while shifting by one pixel.

The present invention has a purpose that a two-dimensional code reading process is wherein if the orientation of said two-dimensional code is angularly rotated in said input image, partial image within said retrieval range which is specified by applying the coordinates of said retrieval reference point to the rotational correction based upon the angle at which said orientation of said two-dimensional code is rotated is cut out from said input image and in that after applying the rotation correction for the cut out partial image based upon said rotational angle, the position of said alignment pattern is detected by conducting said template matching while shifting said rotation corrected partial image by one pixel for extracting said alignment pattern.

The present invention has a purpose that a two-dimensional code reading process is wherein said partial image which is to be processed for said template matching is the partial image which is cut out from said input image which is under a condition prior to binarization processing.

The present invention has a purpose that a two-dimensional code reading process is wherein when processing for cutting out said data cells to determine the data value of each data cell which forms said two-dimensional code is conducted, conversion coefficients of coordinate conversion expressions for converting the position of the center of each data cell of said two-dimensional code into the coordinates in said input image based upon the cell positions of the centers of said finder patterns and said alignment pattern, which are detected at a step of identifying the position of said data cell and based upon the number of cells of said two-dimensional code which is determined by the identified version, in that the center position of each data cell is converted into the coordinates of said input image by using said coordinate conversion expressions to which the calculated conversion coefficients are applied for identifying the coordinates corresponding to the position of the center of each data cell, and in that a data value of each data cell is determined based upon the density of the coordinate position which is identified by said position identifying process for conducting cutting out of each data cell.

The present invention has a purpose that a two-dimensional code reading process is wherein when a process for cutting out said data cells to determine the data value of each data cell which forms said two-dimensional code, the density of said input image at coordinates corresponding to the position of the center of the data cell which is identified by said position identifying process is the density which is obtained from the pixel value of the pixel existing at said coordinates if a pixel exists at the coordinates in said input image corresponding to the position of the center of the identified data cell and it is the density which is obtained by interpolation of pixel values of peripheral pixels adjacent to said coordinates if a pixel does not exist at the coordinates in said input image corresponding to the position of the center of the identified data cell, and in that the data value of each data cell is determined by comparing said density of the input image at the coordinates corresponding to the position of the center of each data cell with a light and dark threshold for identifying the data value of each data cell.

The present invention has a purpose that a two-dimensional code reading process is wherein said light and dark threshold for identifying the data value of each data cell is set based upon the pixel values of the pixels in said input image which are located along the diagonal of said two-dimensional code.

The present invention has a purpose that a program for reading a two-dimensional code is described in program code which is capable of causing a computer to execute a process of reading a two-dimensional code as described above.

The present invention has a purpose that a recording medium is readable by a computer and on which the two-dimensional code reading program as described above is recorded.

Accordingly, by applying the present invention, when the finder patterns are to be detected, evaluation values representative of how the ratio of the first patterns specific to the finder patterns, for example, black:white:black:white:black pattern of cells is approximate to the ratio of 1:1:3:1:1. The detection precision of the finder pattern can be enhanced by comparing the evaluation values concerning the whole of the input image. Thus, the present invention contemplates to make it possible to detect the finder patterns from even the input image having a comparatively low resolution and noise.

Alternatively, scanning of the finder pattern for determining whether or not the pattern to be detected is approximate to the first pattern specific to the finder pattern is conducted totally three times in horizontal, vertical and inclined directions. The invention contemplates to enhance the detection precision of the finder pattern by using the evaluation value concerning the ratios of patterns in respective directions even if the two-dimension code is angularly rotated in the input image.

Hence, by applying the present invention, the inclination of the side of the two-dimensional code, part of which is formed by the outer contour of the finder pattern is determined by detecting the inclination of the outer contour of the finder pattern by scanning it. Expected coordinates of the alignment pattern is determined by determining the intersection of straight lines which are parallel with said sides of the two-dimensional codes and pass through the centers of said finder patterns. The present invention contemplates to detect with a high precision the alignment pattern by conducting a template matching between the detected alignment pattern and the template which matches the feature of the alignment pattern using the input image prior to binarization. Even if the two-dimensional code exists with being distorted, the retrieval range in which the alignment pattern may exist can be accurately determined. The present invention makes it possible to reduce the amount of processing which is required to examine the input image for retrieving the alignment pattern as is done in the prior art, resulting in that saving of the whole processing amount which is necessary to detect the position of the alignment pattern.

By applying the present invention, the two-dimensional code may not be provided with a timing pattern unlike the prior art, so that necessity of detection of the timing pattern is not omitted. The positions of the centers of data cells are determined from four pairs of coordinates such as those of three finder patterns and one alignment pattern by using coordinate conversion expressions. The data values of data cells can be determined by the density of the input image in determined cell position, so that the period of time which is necessary for timing pattern detecting processing is reduced and the period of time which is necessary to determine the data values of data cells is reduced. Therefore, the amount of the whole of the data cell cutting out processing can be remarkably reduced.

The value of the pixel which is located in the center of the cell is estimated by interpolating the values of pixels adjacent to the center of the cell even if no pixel exist in the input image in a position corresponding to the center of the data cell. The value of the data cell is determined by comparing the estimated value of the pixel with a black and dark threshold which is preliminarily determined base upon the values of a plurality of pixels located in specified positions within the two-dimensional code in which data cells are disposed. Even if cutting out of data cells can not be conducted, so that reading of the two-dimensional code fails, the version which is determined based upon the width of the finder patterns and the spacing therebetween is changed by one (for example, increased by one). Reading of the two-dimensional code and processing of the cutting out of data cells is repeated again, for reducing the influence of misdetermination of the version.

BRIEF DESCRIPTION OF THE DRAWINGS

FIG. 10 is a constitutional view showing an example of the evaluation value table on which the candidates of the detected finder patterns are recorded.

FIG. 11 is a constitutional view showing an example of the evaluation value table showing a results of unification and arrangement of the candidates of the finder patterns which is recorded on the evaluation value table which is shown in FIG. 10.

FIG. 14 is a relational view showing the relation between the combination of the directions of the two-dimensional code shown in FIGS. 8A, 8B, 8C and 8D and four areas shown in FIG. 13.

FIG. 15 is a relational view showing the relation between each direction of the two-dimensional code shown in FIGS. 8A, 8B, 8C and 8D and each area to which the coordinate positions of the centers of the finder patterns F1 and F2 belong.

PREFERRED EMBODIMENT OF THE INVENTION

The two-dimensional code reading apparatus of one embodiment of the present invention will be described with reference to the drawings.

Now, embodiments of the two-dimensional code reading apparatus of the present invention will be described with reference to drawings as follows.

Figure 1:
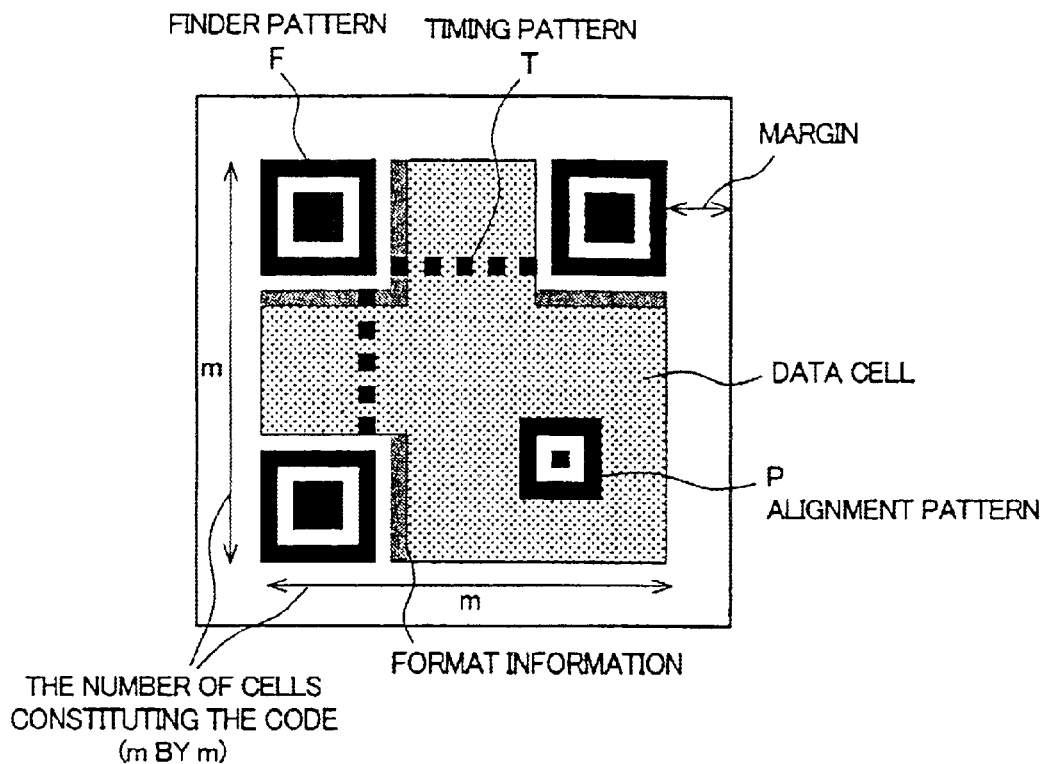
FIG. 1 is a schematic view showing an exemplary configuration of the QR code.
Figure 2:
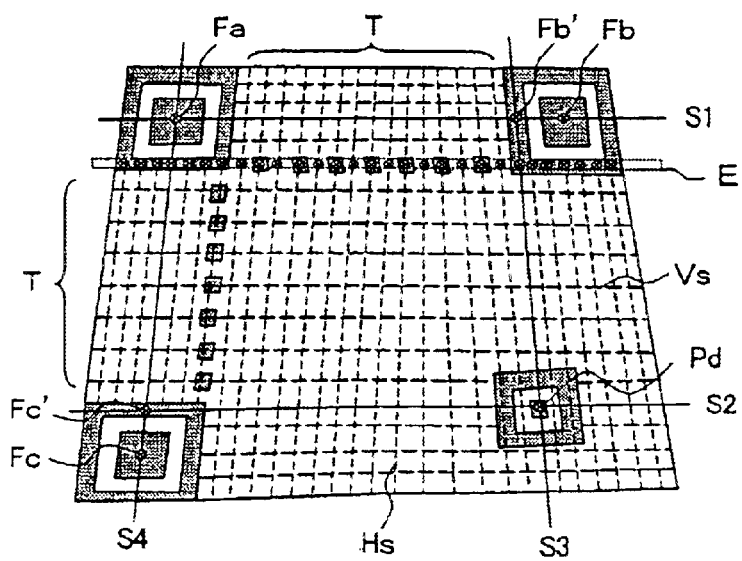
FIG. 2 is a schematic view explaining prior art for calculating the coordinate of the center of the data cell of QR code.
Figure 3:
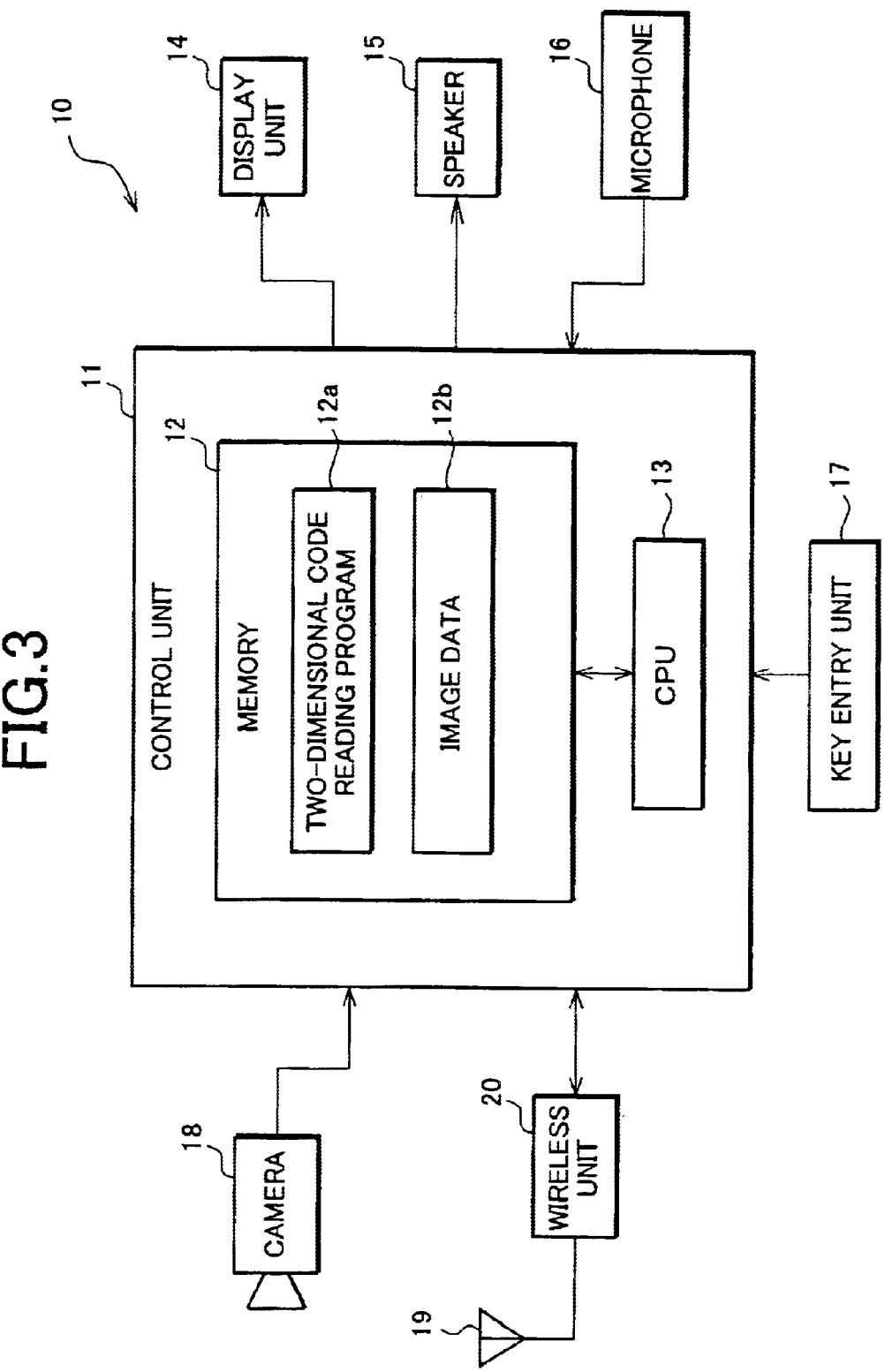
FIG. 3 is a block diagram showing an example of the configuration of the two-dimensional code reading apparatus in one embodiment of the present invention.

FIG. 3 is a block diagram showing an example of the configuration of the two-dimensional code reading apparatus in one embodiment of the present invention. In the drawing, a reference numeral 10 denotes the two-dimensional code reading apparatus which comprises a control unit 11 having a memory 12 and a CPU 13, a display unit 14 for displaying the image information (two-dimensional code) and the like, a speaker 15 for outputting an audio signal, a microphone 16 for inputting a speech signal, a key entry unit 17 for the entry of key operation information, a camera (image pick up unit) 18 for capturing image information (two-dimensional code), an antenna 19 for receiving and transmitting electromagnetic waves, and a wireless unit 20 for controlling the reception and transmission for telecommunication. An exemplary inner configuration of a portable cellular phone with a camera which has a capability of the two-dimensional code reading apparatus 10 (hereinafter referred to as "camera equipped cellular phone 10") is illustrated in the present embodiment.

A two-dimensional code reading program 12a for executing the functions of the tow-dimensional code reading apparatus 10 and an image data (input image) 12b which is input from the camera 18 are stored in the memory 12 of the control unit 11. On performing the two-dimensional code reading process of the present invention, the CPU 13 properly reads out the two-dimensional code reading program 12a for executing the processing for the two-dimensional code image (image data 12b) input from the camera 18 in accordance with the program.

The camera equipped cellular phone 10 of the present embodiment is capable of transmitting the two-dimensional code image or read result which is picked up by the camera 18 to the other camera equipped cellular phone from the wireless unit 20 over the network and the like, and receiving the two-dimensional code image or a result read from the other camera equipped cellular phone over the network and the like. Alternatively, the two-dimensional code reading program 12a may be stored in a server (not shown) and the like so that the two-dimensional code reading process is performed therein. In this case, the server receives the two-dimensional code image from the camera equipped cellular phones or personal computers and the like over a network and returns the reading result thereto after it performs the two-dimensional code reading processing for the received two-dimensional code image.

Figure 4:
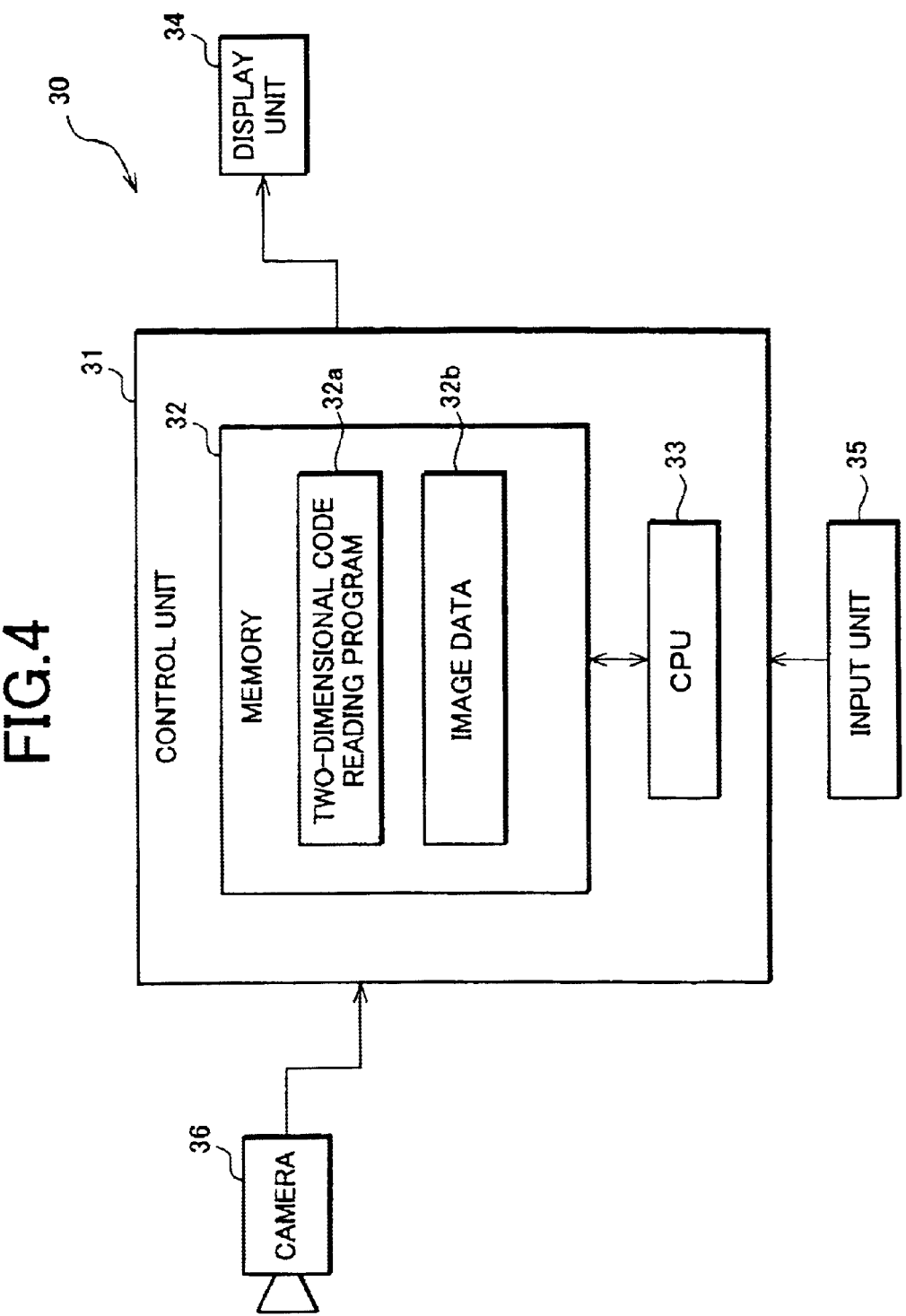
FIG. 4 is a block diagram showing an exemplary configuration of the two-dimensional code reading apparatus of the other embodiment of the present invention.

FIG. 4 is a block diagram showing an exemplary configuration of the two-dimensional code reading apparatus of the other embodiment of the present invention. In the drawing, a reference numeral 30 denotes a two-dimensional code reading apparatus which comprises a control unit 31 having a memory 32 and a CPU 33, a display unit 34 for displaying image information (two-dimensional code), an input unit 35 for inputting operation information and a camera 36 (image pick up unit) for acquiring image information (two-dimensional code). An exemplary inner configuration of a digital camera having a capability of two-dimensional code reading apparatus 30 is illustrated in the present embodiment.

A two-dimensional code reading program 32a for executing the functions of the tow-dimensional code reading apparatus 30 and an image data (input image) 32b which is input from the camera 36 are stored in the memory 32 of the control unit 31. On performing the two-dimensional code reading process of the present invention, the CPU 33 properly reads out the two-dimensional code reading program 32a for executing the processing for the two-dimensional code image input from the camera 36 in accordance with the program.

Figure 5:
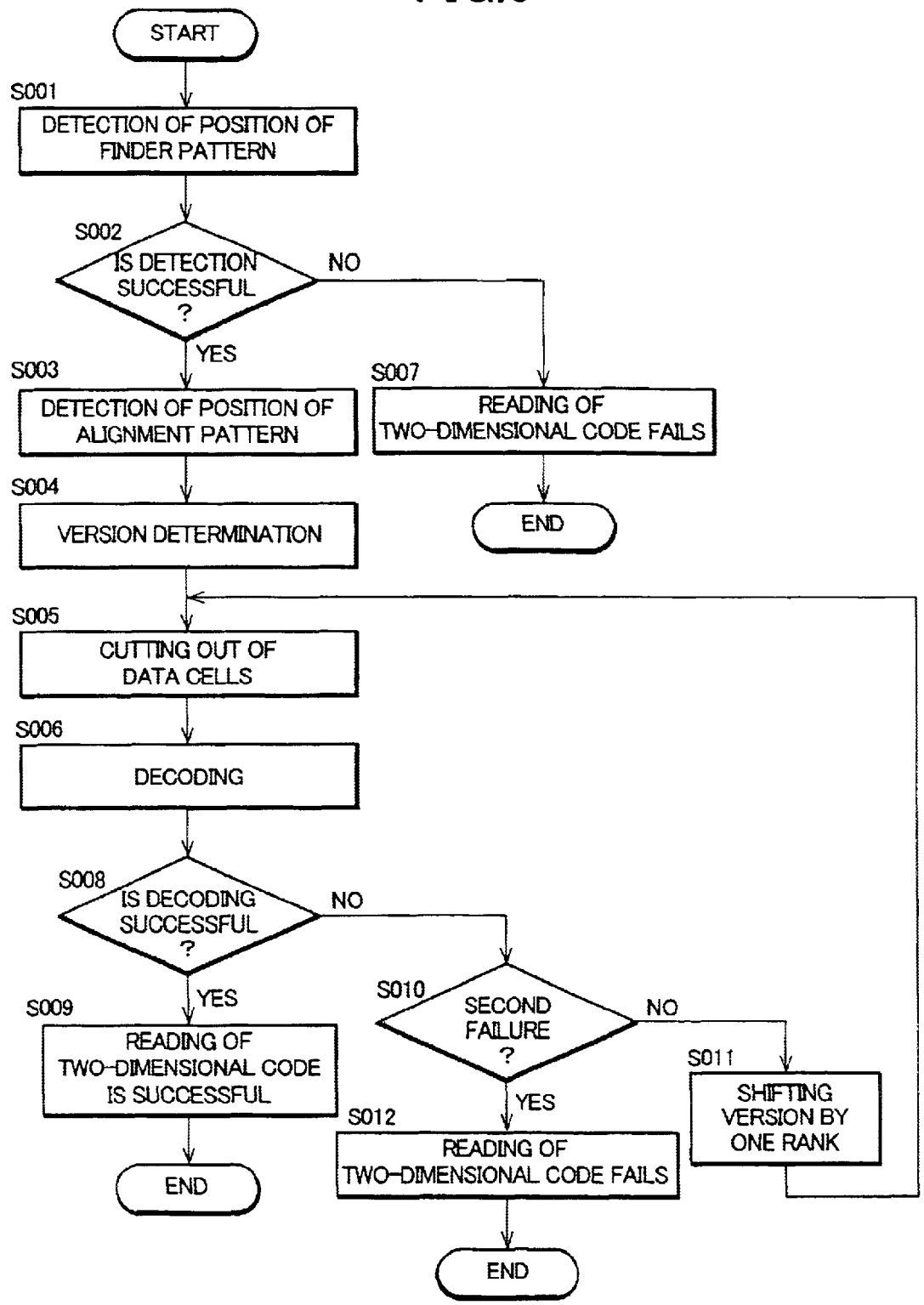
FIG. 5 is a flowchart showing an example of operation flow in the two-dimensional code reading apparatus of the present invention.

An example of flow of operation of the two-dimensional code reading apparatus of the present invention is shown in flow chart of FIG. 5. In the following description of the embodiment, the present invention will be described with reference to case in which QR code (Quick Response Code) is used as a two-dimensional code. However, the present invention is not limited to such a QR code. The present invention is applicable to any case if the two-dimensional code represents various items of information by arranging two-dimensional (i.e. vertically and laterally) data cells on which binary data is recorded and comprises finder patterns for determining the position of the two-dimensional code in the input image and an alignment pattern which makes it possible to correctly detect the data cell position of two-dimensional code even if the input image is picked up in an oblique direction so that it is distorted.

As mentioned above, in case of QR code, finder patterns are disposed in predetermined (predetermined plural) positions at three corners of the two-dimensional code (QR code) and each of the finder patterns comprises a specific first pattern (a 7 by 7 cell square pattern in which the ratio of black:white:black:white:black is 1:1:3:1:1). The alignment pattern is disposed in a predetermined position different from the corners at which the finder patterns are disposed (in a position which is inwardly remote by 7 cells from a corner at which no finder patterns are disposed) and comprises a specific second pattern (5 by 5 cell square pattern in which the ratio of black:white:black:white:black is 1:1:1:1:1).

The two-dimensional code comprising two kinds of specific positioning patterns, that is, three finder patterns and one alignment pattern is adapted to record binary data which is black or white on each of data cells which are disposed in an m by m lateral and vertical two-dimensional array in accordance with a predetermined rule to make it possible to two-dimensional represent various items of information.

In addition to two kinds of specific positioning pattern, conventional QR code comprises a timing pattern for guiding the position of each data cell as mentioned above. In the present invention, it is not necessary to comprise a timing pattern even in case of determining the position of the data cell. The two-dimensional code suffices to comprise only above-mentioned two kinds of specific patterns.

In other words, it is possible to accurately detect the position of each data cell by using three finder patterns and one alignment pattern even if the two-dimensional code is rotated or tilted. It is possible to determine the information (data content) recorded in the two-dimensional code by reading the data values (binary data) recorded on data cells in the detected cell positions to convert them into a bit array for decoding it in accordance with predetermined rule.

As shown in flow chart of FIG. 5, a record sheet bearing a two-dimensional code as an image is placed on the two-dimensional reading apparatus, so that the two-dimensional code is read by an image sensor.

Input image which is read by the image sensor is converted into an input image comprising white (light) and black (dark) binary images by binary processing. By scanning the converted binary images, the position of a finder pattern comprising a specific first pattern in which the ratio of black:white:black:white:black is 1:1:3:1:1 on each run is detected from the binary images (step S001). Detection of the position of the finder pattern causes the position of the two-dimensional code in the input images is identified. The operation for detecting the position of the finder pattern will be described hereafter in detail.

If the detection of the finder pattern is failed (NO at step S002), processing is completed as reading of the two-dimensional code is failed, so that it can not be recognized (step S007).

If detection of all of three finder patterns which are disposed at three corner of the two-dimensional code is successful (YES at step S002), the coordinates of three finder patterns are determined. The cell size representative of the dimensions of one cell is determined from the width of the finder pattern representative of the size of the finder pattern. The orientation of the two-dimensional code is determined from the coordinates of three finder patterns.

Then, detection of the position of the alignment pattern is conducted by calculating expected coordinates (i.e. a retrieval reference point) at which the alignment pattern is expected to exist and by examining the cells in the retrieval range which is specified by the expected coordinates (retrieval reference point) (i.e. a template matching is conducted) (step S003). The coordinates of the alignment pattern which make it possible to determine whether the two-dimensional code is not rectangular (including square), but inclined is determined. Operation for detecting the position of the alignment pattern will be described hereafter in detail.

Then, determination of the version of the two-dimensional code is conducted (step S004). In other words, the cell size representative of the dimensions of a cell of two-dimensional code is calculated from the width of the finder pattern representative of the size of the finder pattern, so that a determination is conducted for determining the version which determines the number of the cells in the two-dimensional code. Operation for determining the version will be described hereafter in detail.

Then, cutting out of data cells is conducted (step S005). A conversion coefficient which converts the cell position of each data cell of the two-dimensional code into relevant coordinate position of the input image is determined in accordance with the configuration of the two-dimensional code which is derived from the four coordinates for reference comprising the three pairs coordinates of the finder patterns and the coordinates of the alignment pattern and the determined version. The coordinates in the input image corresponding to the central position of each data cell is identified by the coordinate conversion expression to which the determined conversion coefficient is applied. The data value (data of binary value) of each data cell is determined by determining the density of the input image of the identified coordinate position for cutting out each data cell. In other words, prior art technique for accumulating the number of the white and black pixels which are positioned in the range of each cell is not used. The data value of each data cell, that is the value of each bit is determined. Operation for cutting out data cells will be described hereafter in detail.

The bit array (bit arrangement) which follows the data cell arrangement in the two-dimensional code is decoded in accordance with the predetermined rule (step S006). An error correction is made for the bit array and the bit array which is subjected to error correction, that is data arrangement is decoded in accordance with the predetermined rule for converting the data arrangement into character array and the like.

If such conversion into character array and the like, i.e. decoding processing is successful, so that significant character array and the like is obtained (YES at step S008), processing is completed as reading of the two-dimensional code; i.e. recognition of the two-dimensional code being successful (step S009).

If not bit error can be corrected by the error correction, or the data cell arrangement, i.e. bit array can not be converted into character array and the like in accordance with the predetermined rule, (No at step S008), then decoding is determined as failure. If the current failure is first (No at step S010), the number of cells which constitute the two-dimensional code is changed by changing the version by one. For example, the number of the cells which constitute the two-dimensional code is increased by increasing the version up by one (step S011), the process is returned to step S005 to repeat cutting out of data cell and decoding processing again.

In other words, the faulty determination of the version at step S004 is corrected by shifting the version, so that the version can be corrected into relevant version of the two-dimensional code as prepared.

If it is determined that second failure in decoding occurs (YES at step S010), processing is failed in reading of the two-dimensional code, i.e. recognition of the two-dimensional code being failure (step S012).

Now, operation for detecting the positions of the finder patterns at step S001 in FIG. 5 will be described in detail. An example of operation flow relating to the detection of the positions of the finder patterns is illustrated in the flow chart of FIG. 6.

Figure 6:
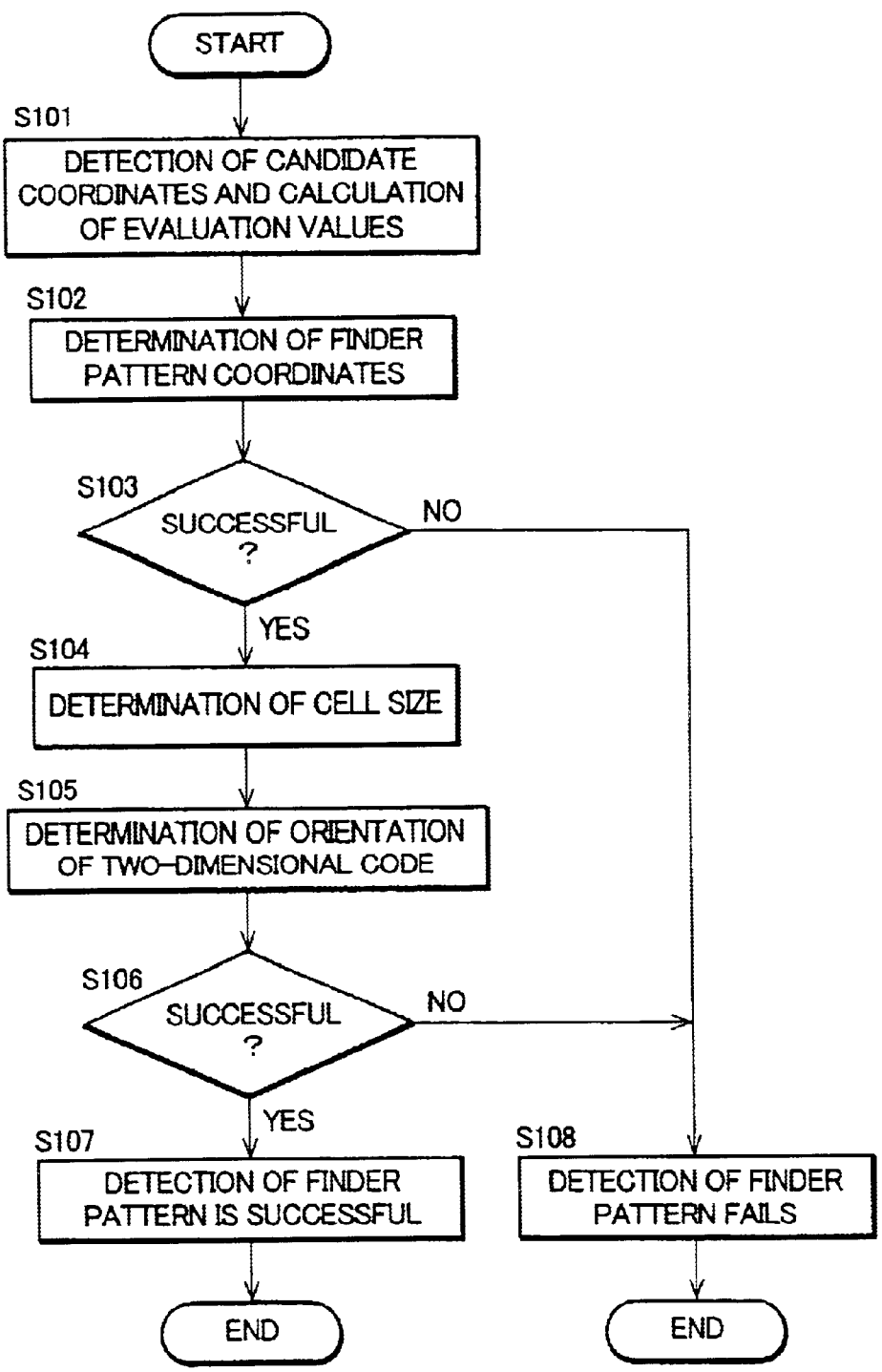
FIG. 6 is a flowchart showing an example of operation flow which is related with the detection of the position of the finder pattern.

As shown in FIG. 6, firstly detection of candidate coordinates of the finder patterns and calculation of evaluated values is conducted (step S101). In other words, input image comprising binary values, that is, white and black pixels is sequentially scanned, so that the run length of white and black pixels are determined in three directions such as horizontal, vertical and inclined directions. The determined run lengths of the white and black pixels are evaluated according to the above-mentioned features of the finder patterns (specific first pattern). Central coordinates of a plurality of candidate finder patterns at which it is assumed that the finder patterns exist, that is candidate central coordinates and evaluated value representative of how the candidate finder pattern in each of candidate central coordinates resembles to the features of the finder pattern are calculated according to a preliminarily prepared evaluation formula and recorded.

At this time, the width, i.e. size of the candidate finder pattern at each candidate central coordinates is also recorded. Although the width or size of the candidate finder pattern to be recorded is that which is averaged in three directions such as horizontal, vertical and inclined directions, the present invention is not limited to this averaged width. For example, the least width may be recorded, or a width which is an average of two widths which are most approximate. Detection of such candidate central coordinate position and calculation of evaluation value will be described hereafter in detail.

Then, the determined candidate central coordinate position and evaluation value of the candidate finder pattern and the width of the candidate finder pattern are analyzed. Finally, three finder patterns in the input image and respective central coordinate positions of the finder patterns are determined (step S102).

If such an analysis is failed, so that the central coordinate positions of three finder patterns can not be determined (NO at step S103), then processing is terminated as detection of the finder patterns being failure (step S108).

If such an analysis is successful, so that determination of the central coordinate positions of three finder patterns is successful, the average value of the determined widths of three finder patterns is calculated and the cell size representative of data cell dimension is calculated from the average value of the widths of the finder patterns (step S104).

Figure 8A:
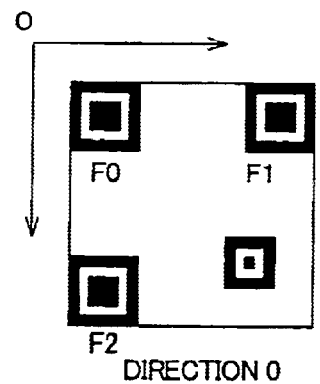
FIGS. 8A, 8B, 8C and 8D are schematic views showing the relation between the orientation of the two-dimensional code and the position of the finder pattern.
Figure 8B:
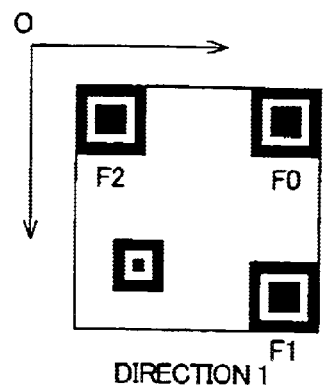
Figure 8C:
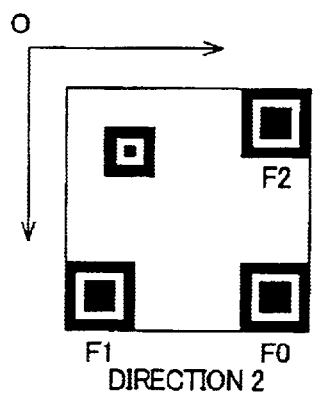
Figure 8D:
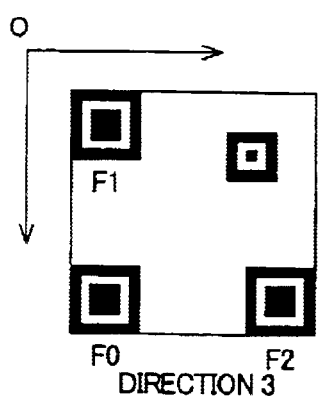

Then, the orientation of the two-dimensional code in the input image is determined from the determined central coordinate positions of three finder patterns (step S105). Herein the orientation of the three-dimensional code represents where the upper side of the two-dimensional code, for example, QR code (i.e. the side on which the finder patterns F0 and F1 are disposed) is positioned in the input image as shown in FIGS. 8A, 8B, 8C and 8D. FIGS. 8A, 8B, 8C and 8D are schematic views showing the relation between the orientation of the two-dimensional code and the position of the finder pattern. As shown in FIG. 8A, the orientation is determined as "direction 0" when the finder patterns F1 and F2 are located on the right and lower sides of the reference finder pattern F0 respectively and the upper side of the two-dimensional code is located on the upper side of the input image. The operation is determined as "direction 1 (FIG. 8B), direction 2 (FIG. 8C) and direction 3 (FIG. 8D) when the two-dimensional code is angularly rotated clockwise by angles 90, 180 and 270 (that is the upper side of the two-dimensional code is located on the right, lower and left side of the input image, respectively.

Further, a determination is made whether or not the positional relation of the central coordinates of three finder patterns meets predetermined criteria (step S106). If it does not meet the predetermined criteria (NO at step S106), processing is terminated as detection of the finder patterns failed (step S108). In other words, it is determined that the detection of finder patterns flailed at step S002 shown in FIG. 5 and process will proceed to step S007 at which processing is terminated.

On the other hand, if the positional relation meets the predetermined criteria (YES at step S106), it is determined that the detection of the finder pattern is successful and determination of the orientation of the two-dimensional code is also successful and processing is terminated (step S107).

Now, operation for detecting the candidate central coordinate position of each candidate finder pattern and the recording of evaluated value at step S101 shown in FIG. 6 will be described in detail. An example of flow of the operation relating to the detection of the candidate central coordinates of the candidate finder pattern and recording of evaluated value is illustrated in the flow chart of FIG. 7.

Figure 7:
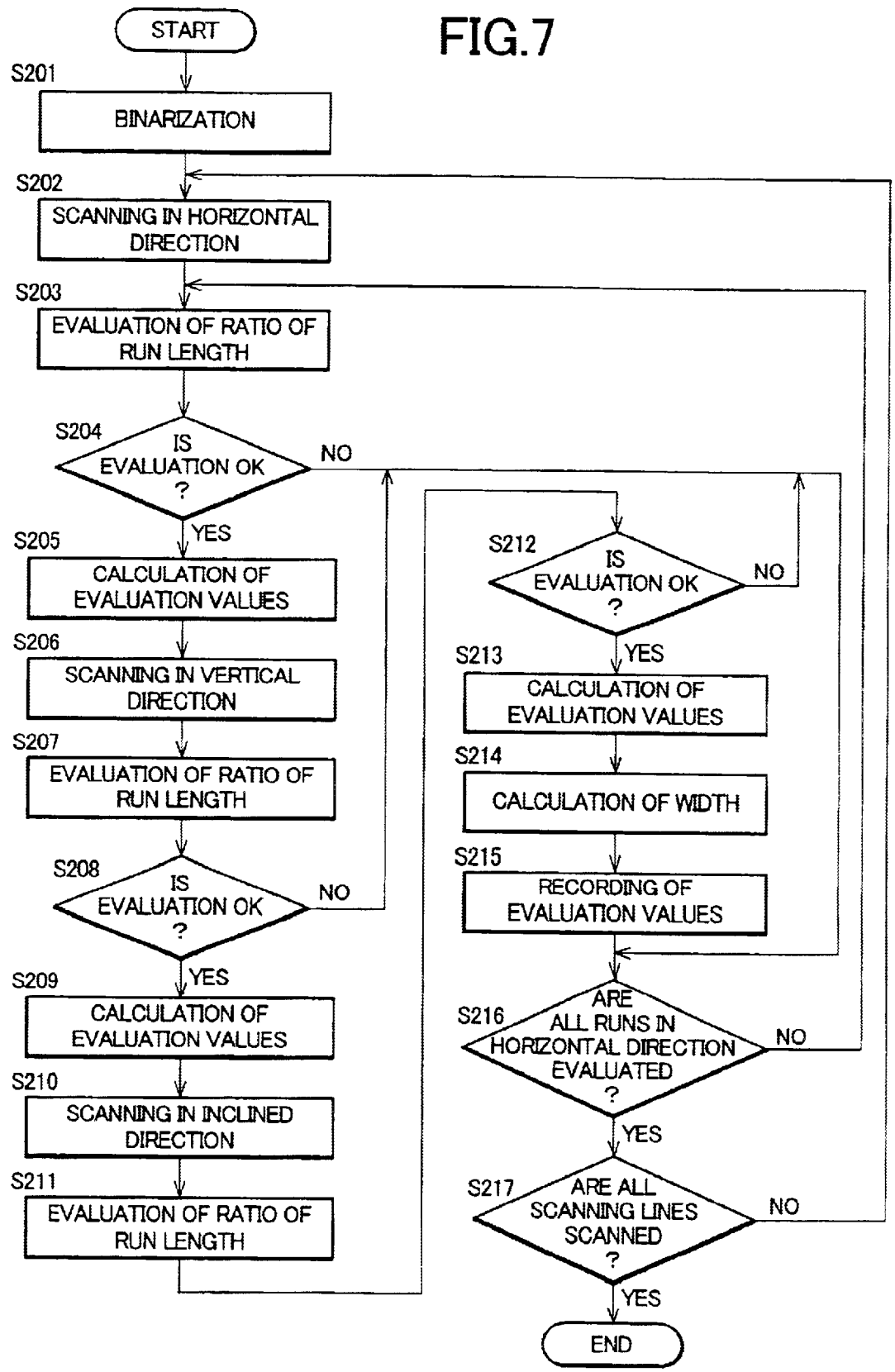
FIG. 7 is a flowchart showing an example of operation flow which is related with the detection of the coordinate position of the center of the candidate finder pattern and recording of evaluation value.

Binarization of input image which is read by the image sensor into black and white pixels is conducted as shown in FIG. 7 (step S201). The threshold for binarization may be, for example, an intermediate value between maximum and minimum values in pixel values which are obtained by scanning the whole of the input image. The technique using such intermediate value as a threshold requires a small amount of processing so that it is suitable for high speed processing.

Then, horizontal scanning is sequentially conducted from the leading point of the binary image, so that run lengths of all black and white pixels in the horizontal scanning line are recorded (step S202). That is, the beginning points of the black and white runs in a horizontal scanning direction are recorded, the length between the beginning points of a black run and next white run is calculated as a black run length. Similarly, the length between the beginning points of a white run and next black run is calculated as white run length.

In order to detect a candidate of the finder pattern, an evaluation whether or not the ratio of the calculated black run:white run:white run:white run:black run is approximate to the ratio of 1:1:3:1:1 of the first pattern which is specific to the finder pattern is made by a predetermined threshold (step S203). If it is evaluated that it is approximate to the ratio of 1:1:3:1:1 (YES at step S204), an evaluation value corresponding to an error between the ratio of the calculated black run:white run:black run:white run:black run and the ratio of 1:1:3:1:1 is determined (step S205). A method of evaluation of the ratio of every run and of calculating evaluation value will be described hereafter.

Figure 9:
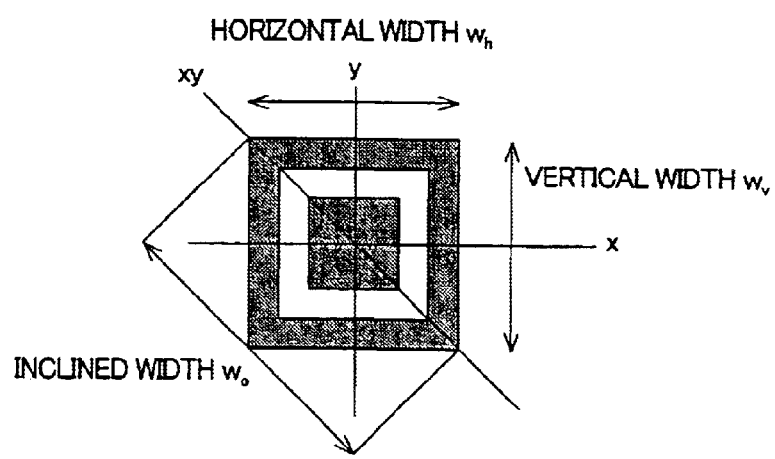
FIG. 9 is a schematic view explaining the width and the coordinate position of the center of the detected candidate finder pattern.

Further, the coordinates of the center of the run of the detected candidate finder pattern are recorded as an origin of the horizontal coordinate (that is, x coordinate) and the length of run of the candidate finder pattern is recorded as horizontal width $W_h$. That is, as shown in FIG. 9, the width of the black pixels at the opposite ends of the candidate finder pattern which is detected in a horizontal scanning direction is recorded as $W_h$ and the center position between the black pixels at opposite ends of the candidate finder pattern, that is, candidate central coordinate position is recorded as an origin of the horizontal coordinate. FIG. 9 is a schematic view explaining the width and the candidate central coordinate position of the detected candidate finder pattern.

Subsequently, the run of the candidate finder pattern in a vertical direction is checked by scanning in a vertical direction from the origin of the horizontal coordinate, that is, the coordinate position of the center of the run of the horizontally detected candidate finder pattern (step S206).

Then, similarly to the steps S202 and S203, the run lengths of white and black pixels along a vertical scanning line are determined. An evaluation whether the ratio of the calculated black run:white run:black run:white run:black run is approximate to the ratio of 1:1:3:1:1 which is a first pattern specific to the finder pattern is made by using a predetermined threshold (step S207). If it is evaluated that it is approximate to the ratio of 1:1:3:1:1 (YES at step S208), similarly to the step S205, an evaluation value corresponding to an error between the ratio of the calculated black run:white run:black run:white run:black run and the ratio of 1:1:3:1:1 is determined (step S209).

As shown in FIG. 9, the coordinate position of the center of the detected candidate finder pattern run is recorded as an origin of the ordinate (that is, y ordinate) while the run length of the candidate finder pattern is recorded as the vertical width $W_v$.

Subsequently, the run of the candidate finder pattern is checked by conducting a scanning from an origin of the ordinate at an origin of the abscissa, that is an intersection between the ordinate and the abscissa (the center of the runs of the candidate finder pattern which are detected in a horizontal and vertical directions) in an direction which is inclined at 45° with respect to the horizontal scanning line (step S210).

Then, similarly to steps S202 and S203, the run lengths of white and black pixels along the inclined scanning line are determined and an evaluation is made whether or not the ratio of the calculated black run:white run:black run:white run:black run is approximate to the ratio of 1:1:3:1:1 which is the first pattern specific to the finder pattern by using a predetermined threshold (step S211). If it is evaluated that it is approximate to the ratio of 1:1:3:1:1 (YES at step S212), an evaluation value is determined which corresponds to an error between the ratio of the calculated black run:white run:black run:white run:black run and the ratio of 1:1:3:1:1 as is similar to step S205 (step S213).

As shown in FIG. 9, the coordinate position of the center of the run of the detected candidate finder pattern is recorded as an origin of the inclined coordinates (that is x, y coordinates) and the run length of the candidate finder pattern is recorded as the inclined width $W_o$.

If any one of three conditions in a horizontal, vertical and inclined directions is not satisfied, that is, it is not evaluated that the ratio exceeds to the predetermined threshold so that it is not approximate to the ratio of 1:1:3:1:1 at any of steps S204, S208 or S212 (NO at step S204, NO at step S208 or NO at step S212), it is determined that the coordinates of the center of the candidate finder pattern are not the center coordinates at which no finder pattern exists. The relevant candidate finder pattern is removed from the candidates of the finder pattern and process will proceed to step S216 for conducting an evaluation concerning to the black and white run of the finder pattern at next horizontal coordinate position.

If all of three conditions in a horizontal, vertical and inclined directions are satisfied, after processing steps till step S215, then the coordinates of the center of the candidate finder pattern which satisfies three conditions in a horizontal, vertical and inclined directions are recorded as the candidate center coordinates of the candidate finder pattern. At this time, an average of the horizontal width $W_h$, vertical width $W_v$, and inclined width $W_o$ of the candidate finder pattern in interest is recorded as the width of the candidate finder pattern (step S214). The present invention is not limited to the above-mentioned setting of the width of the candidate finder pattern.

Further, a sum of the evaluation values of the run lengths in a horizontal, vertical and inclined directions (evaluation of an error between the detected pattern and the first pattern specific to the finder patterns, i.e. a value representative of the approximation degree between the detected pattern and the first pattern of specific to finder pattern) is recorded as the evaluation value at coordinates of the candidate finder pattern (step S215).

Subsequently, if an evaluation of the finder pattern of all black and white runs along the horizontal scanning line which is determined at step S202, is not completed (NO at step S216), process is returned to step S203, evaluations which are similar to the above-mentioned evaluations are repeated for evaluating remaining horizontal runs which have not been evaluated. If an evaluation of the finder pattern of all black and white runs along the scanning line is completed (YES at step S216), or the scanning along all the horizontal scanning lines is not completed yet (NO at step S217), process is returned to step S202 for scanning of next horizontal scanning line, so that an evaluation of the finder pattern of black and white runs on next scanning line is repeated as is described above.

If scanning of all horizontal scanning lines is completed (YES at step S217), processing is terminated.

Now, a method of the comparative evaluation between the ratio of the black run:white run:black run:white run:black run which is calculated based upon a result of scanning of input image and the ratio of 1:1:3:1:1 which is the first pattern specific to the finder pattern and a method of calculating evaluation value corresponding to an error therebetween (representative of an approximation degree therebetween), as is shown at step S204 in FIG. 7 (and steps S208 and S212), step S205 (and steps S209 and S213) will be described.

Firstly, lengths of black run:white run:black run:white run:black run which are calculated as candidates of the finder pattern are represented as $R_0$, $R_1$, $R_2$, $R_3$ and $R_4$.

If a candidate of the finder pattern is a target true finder pattern, then a sum of the run length should be 7 cells.

Accordingly, the run lengths a and b corresponding to one cell are calculated by each calculated cell by using two expressions as follows:

$$a=(1/4)\cdot(R_0+R_1+R_3+R_4) \quad (1)$$

$$b=(1/7)\cdot(R_0+R_1+R_2+R_3+R_4) \quad (2)$$

Subsequently, an error d is calculated using following expression (3). In other words, the evaluation expression represents an error d between the candidate finder scanned pattern and the first pattern specific to the finder pattern. Conversely, the smaller the error d becomes, the higher the approximation degree between the candidate finder pattern and the first pattern becomes.

$$d=|a-b|+|R_2-3b| \quad (3)$$

If the evaluation expression is represented by following expression (4) is established when the error d is calculated using an expression (3), evaluation of the candidate of the finder pattern is passed as considering that the ratio of the calculated black run:white run:black run:white run:black run is approximate to the ratio of 1:1:3:1:1 of the first pattern specific to the finder pattern.

$$d \leq \text{Thresh} \quad (4)$$

A term "Thresh" used in here is a threshold for identifying whether or not the candidate finder pattern is approximate to the first pattern specific to the finder pattern. If the error d exceeds a value of Thresh, it is determined that the relevant candidate finder pattern is different from first pattern specific to the finder pattern, so that it is omitted from the candidates of the finder pattern. A value of Thresh is a constant which may be preset to desired value by a user depending upon the type and application of two-dimensional code, and/or quality of input image.

If the evaluation is passed as a candidate of the finder pattern, an evaluation value e corresponding to the error, that is representative of the approximation degree is calculated using following expression (5) and is recorded.

$$e = \text{Thresh} - d \quad (5)$$

The larger evaluation value e indicates that the candidate finder pattern is more approximate to the finder pattern.

The evaluation expressions (1) to (5) are only examples of the present invention. The present invention is not limited to only these expressions. Any desired evaluation expressions which are preliminarily determined based upon the type and application of the two-dimensional code and/or the quality of input image may be used if they make it possible to evaluate the error or approximation degree between the candidate finder pattern and the first pattern specific to finder pattern.

Although the evaluation of the degrees of the respective errors of the run lengths $R_0$, $R_1$, $R_3$, $R_4$ is omitted in the above-mentioned expressions (1) to (5), an evaluation expression which evaluates the degree of the respective errors of the run lengths $R_0$, $R_1$, $R_3$, $R_4$ may be used in an application environment requiring a more exact evaluation. Alternatively, an evaluation is made whether or not the difference between the width of the candidate of the finder pattern and the width which is predetermined as the width of the finder pattern falls within a predetermined tolerance. If it is evaluated that it exceeds the predetermined tolerance, the relevant candidate finder pattern may be omitted from the candidates of the finder pattern as it having a size different from the size specific to the finder pattern. A term "tolerance" used herein, similarly to threshold Thresh, is a constant which may be predetermined to an any value by a user depending upon the type and application of two-dimensional code and/or quality of input image.

Now, a process for determining the coordinates of the finder pattern which is shown at step S102 of FIG. 6 will be described. In other words, a process for determining the coordinates of the centers of three finder patterns in the input image will be described.

The coordinates of the center of the candidate finder pattern, its width and its evaluation value of the candidate finder pattern which is a candidate of finder pattern in the input binary image are recorded, for example, in an evaluation value table shown in FIG. 10. FIG. 10 is a configuration view showing an example of evaluation value table in which candidates of the finder patterns which are detected at step S101 in FIG. 6, that is, the candidate finder patterns are recorded.

The information of the candidates of the finder patterns having the same center coordinate position among the candidates of the finder patterns recorded in the evaluation value table as shown in FIG. 10 is unified and the information of the candidates having approximate center coordinate position are unified.

An exemplary condition of approximation determining condition for determining the proximity in center coordinate positions between the candidates of the finder pattern is as follows:

In other words, it is determined that a candidate i is approximate to a candidate j wherein the coordinate of the candidate i of finder pattern is represented as $(x_i, y_i)$, its width is represented as $w_i$, the coordinate of the candidate j is represented as $(x_j, y_j)$ and its width is represented as $w_j$, if following two conditions are met.

Condition 1: The difference between the widths $w_i$ and $w_j$ is smaller than a quarter of the average of two widths $w_i$ and $W_j$. That is, following expression (6) is established.

$$|w_i - w_j| < (w_i + w_j)/8 \quad (6)$$

condition 2: If larger one of the widths $w_i$ and $w_j$ is represented as w, following expressions (7) and (8) are established.

$$|x_i - x_j| \leq (3/14)w \quad (7)$$

$$|y_i - y_j| \leq (3/14)w \quad (8)$$

wherein widths $w_i$ and $w_j$ are average value of widths of the candidates i and j which are calculated in three directions such as horizontal, vertical and inclined directions, respectively, as described above.

Figure 12:
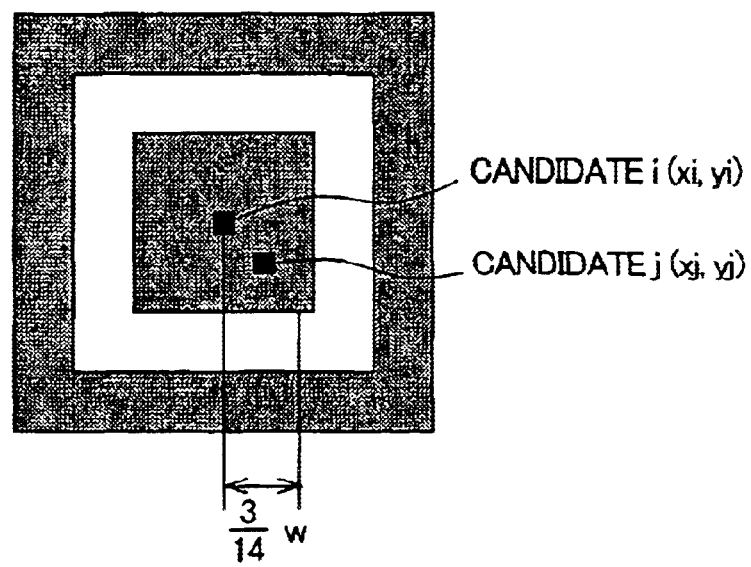
FIG. 12 is a schematic view showing an example of the conditions at which the coordinate positions of the centers of the candidates of the finder patterns are in proximity.

The approximation determining condition will be described with reference to FIG. 12. FIG. 12 is a schematic diagram showing an exemplary condition that the center coordinate positions of the candidates of the finder pattern are proximate to one other. The expressions (7) and (8) of the above-mentioned proximity determining conditions represent that they are equivalent to the fact that the center coordinates of the candidates of two finder patterns are located within a black square of 3 by 3 cells representing a pattern of the central part of the other finder pattern as shown in FIG. 12. The expression (6) for evaluating the size, that is the width of a candidate of the finder pattern represents that the candidate finder patterns which meet the approximation determining conditions defined by expressions (7) and (8) have approximately same sizes which are only less than a factor of 9/8, that is 12%. This allows the candidate finder patterns to be unified as the same candidate finder pattern is detected. Conversely, it represents that the candidate finder patterns are omitted from the candidates of the finder pattern to be unified as the different finder patterns if the sizes of the finder patterns are largely different even when they meet the approximation determining conditions shown in expressions (7) and (8).

The candidates of the finder pattern which meet the approximation determining condition, i.e. the expressions (6), (7) and (8) are unified into one candidate of the finder pattern. When such unification is conducted, an averaged value of the center coordinate positions and widths of the candidates of the finder patterns to be unified is used and a sum of the evaluated values thereof is used.

Unification of the candidates of the finder pattern which are recorded on the evaluation value table as shown in FIG. 10 with the candidates of the finder pattern which meet the approximation determining conditions, that is, expressions (6), (7) and (8) results in an unification result as shown in FIG. 11. FIG. 11 is a configuration view showing an example of the evaluation value table of a unification result for the candidates of the finder pattern which are recorded on the evaluation value table shown in FIG. 10.

As shown in FIG. 11, the candidates which are represented as "0" and "1" are unified and are newly recorded as candidate which is represented as "0". The average values of the center coordinate positions and their widths are preset and the sum of the evaluation values is preset. The candidates which are represented as "2" and "3" are unified and are newly recorded as candidate which is represented as "2". The average values of the center coordinate positions and their widths are preset and the sum of the evaluation values is preset. The candidates which are represented as "5" and "6" are unified and are newly recorded as candidate which is represented as "5". The average values of the center coordinate positions and their widths are preset and the sum of the evaluation values is preset. The candidates which are represented as "7" and "8" are unified and are newly recorded as candidate which is represented as "7". The average values of the center coordinate positions and their widths are preset and the sum of the evaluation values is preset.

Since the candidate "4" does not meet condition 1, that is, expression (6) which evaluates the size of the candidate of the finder pattern, of the approximation determining condition although it has the same center coordinate position as those of the candidates "2" and "3", it is not unified with any of the candidates 2 and 3 and is left on the evaluation value table of FIG. 11.

As mentioned above, the final evaluation value table which has been unified for rearrangement is sequentially retrieved and the finder patterns of three candidates having top three larger evaluation values representative of approximation degree (which corresponds to a number necessary for the finder patterns of two-dimensional code) are selected and determined as three finder patterns. In case of evaluation value table shown in, for example, FIG. 11, the candidates of the finder pattern which are recorded as candidates "0", "5" and "7" having larger evaluation values are determined as three finder patterns of two-dimensional code, so that three coordinates (52, 215), (172.5, 88) and (175, 212) are determined as center coordinate positions of the finder patterns.

If three or more candidates of the finder patterns (which correspond to a number necessary for the finder patterns of two-dimensional code) do not present the unified and rearranged evaluation value table, detection of the finder pattern would fail.

Although a case in which the approximation degree of the sizes of the candidates of the finder patterns is evaluated by using the expression (6) is described in the above-mentioned invention, the present invention is not limited to this case. It is possible to make the approximation degree more exact or conversely mitigate it to preset it to any condition which is desired by a user depending upon the type and application of the two-dimensional code and/or the quality of the input image.

Although a case in which the approximation degree of the center coordinate positions of the candidates of the finder patterns is evaluated by using expressions (7) and (8) has been described, the present invention is not limited to such a case. It is possible to preset it to any condition which is desired by a user depending upon the type and the application of two-dimensional code and/or the quality of the input image. If the candidates of the finder patterns are detected in such positions that the patterns are superposed on one other in the proximity when the conditions of expressions (7) and (8) are mitigated, the candidates of the finder patterns may be considered to be unified.

Now, a process for determining the cell size at step S104 in FIG. 6 will be described.

When three finder patterns have been determined by the above-mentioned process, the cell size which defines the dimension of the cells constituting the two-dimensional code is determined based upon the width of three determined finder patterns. For example, the averaged width of three finder patterns is determined as the width of the finder pattern, from which the cell size is calculated. Since the finder pattern is configured to have a width of seven cells, the size of cells which constitute the two-dimensional code is calculated by dividing by the number of cells, that is 7, the width of the width of the finder pattern which is determined by obtaining the average of the width of each finder pattern.

For example, in case of the evaluation value table which is shown in FIG. 11, the width of the finder pattern is represented as the average of the width of each finder pattern as follows:

(34+31.5+32)/3=32.5

The cell size is calculated as 32.5/7=4.6

Although a case in which the cell size is calculated based upon the average of the widths of three finder patterns has been described, the present invention is not limited to only such a case. For example, in order to strictly cope with the distorted two-dimensional code depending upon the type and application mode of the two-dimensional code, the cell sizes which are different for the peripheral cells of each finder patterns may be calculated and applied if different widths which are significant for each of three finder are detected.

Now, a process for determining the orientation of two-dimensional code at step S105 of FIG. 6 will be described in detail.

A process for determining a reference finder pattern F0 (i.e. a finder pattern which is located in a position of the right angle of a right-angled triangle formed by connecting with lines the centers of three finder patterns disposed at three corners of rectangular shape (including square shape) two-dimensional code (refer to FIGS. 8A, 8B, 8C and 8D)) will be described.

A triangle having apexes at the center coordinate positions of three finder patterns which have been determined in accordance with the above-mentioned process will be considered.

Subsequently, the length of each side or the square of the length of each side of thus formed triangle is determined so that a side having a maximum length is determined. The apex which is not included on the side having the maximum length is made as the center coordinates of the reference finder pattern F0. The center coordinates of the reference finder pattern F0 can be determined by determining the reference finder pattern F0 in accordance with such a process even if the two-dimensional code, that is the finder pattern is not displayed as a rectangular shape (including square shape) in the input image as is similar to the image which is input in a distorted manner.

For example, in case of the evaluation value table shown in FIG. 11, the finder pattern of the candidate "7" is relevant to the reference finder pattern.

If the length of a line connecting the coordinates $(x_i, y_i)$ with coordinates $(x_j, y_j)$ is represented as "l" when the coordinates $(x_i, y_i)$ and $(x_j, y_j)$ are known, generally, the following relationship is established. Accordingly, the length of each side or the square of the length of each side of the above-mentioned triangle can be determined by adding the squares of the differences between the center coordinates of three finder patterns.

$$l^2 = (x_i - x_j)^2 + (y_i - y_j)^2 \qquad (9)$$

Now, a process for determining the positional relationships of two finder patterns other than the reference finder pattern F0 will be described. The positional relationships of the finder patterns F1 and F2 other than the reference finder pattern F0 is defined as shown in FIGS. 8A, 8B, 8C and 8D.

Figure 13:
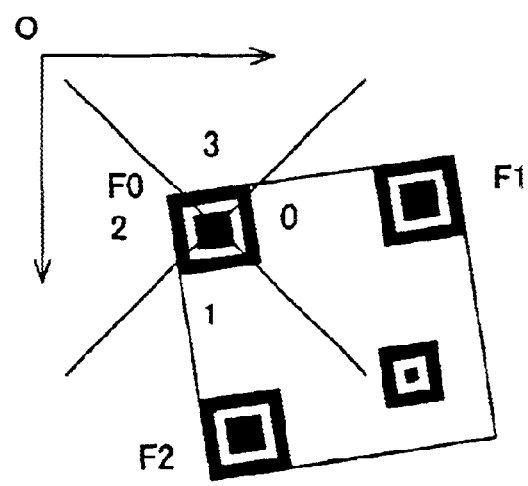
FIG. 13 is an area division view showing a case in which first through fourth quadrants in the position in which x and y coordinates are rotated by 45° in a clockwise direction around the center of the reference finder pattern F0 are areas 0 through 3, respectively.

A process for determining which area the centers of other two finder patterns F1 and F2 belong to when the reference finder pattern F0 is divided into four areas around the center thereof as shown in FIG. 13 will be described. FIG. 13 is a schematic area division view showing an example in which the first through the fourth quadrants which are located in a position in which the ordinate and abscissa having an origin at the center of the reference finder pattern F0 are rotated clockwise by 45° are represented as areas 0 through 3, respectively.

If the coordinates of the reference finder pattern F0 are represented as $(x_{F0}, y_{F0})$ and the coordinates of the finder patterns F1, F2 to be checked are represented as (x, y), the areas to which the finder patterns F1, F2 to be checked are determined based upon the conditions as follows:

Condition at which they belong to an area 0

$$(y-y_{F0}) \leq (x-x_{F0}) \text{ and } (y-y_{F0}) > -(x-x_{F0}) \tag{10}$$

Condition at which they belong to an area 1

$$(y-y_{F0}) > (x-x_{F0}) \text{ and } (y-y_{F0}) > -(x-x_{F0}) \tag{11}$$

Condition at which they belong to an area 2

$$(y-y_{F0}) > (x-x_{F0}) \text{ and } (y-y_{F0}) \leq -(x-x_{F0}) \tag{12}$$

Condition at which they belong to an area 3

$$(y-y_{F0}) \leq (x-x_{F0}) \text{ and } (y-y_{F0}) \leq -(x-x_{F0}) \tag{13}$$

An area to which the center coordinates of two finder patterns F1, F2 other than reference finder pattern F0 can be determined based upon which of the expressions (10) through (13) being met. In another words, the orientation of two dimensional code (i.e. the orientation of two-dimensional code which represents whether or not two-dimensional code is input with being rotated) can be determined based upon the coordinate positions of the centers of detected three finder patterns F0, F1, F2 as mentioned above.

FIG. 14 is a relational view showing the relationship between the direction (orientation) of two-dimensional code shown in FIGS. 8A, 8B, 8C and 8D and the combination of four areas shown in FIG. 13. In other words, the direction of two-dimensional code is determined based upon the combination of two areas to which the coordinate positions of the centers of two finder patterns F1, F2 other than the reference finder pattern F0 belong in accordance with a table shown in FIG. 14. A combination of areas to which the coordinate positions of the centers of two finder patterns F1, F2 belong, which is relevant to conditions of boxes on which no directions are defined (i.e. "–" is indicated) is determined as an invalid combination, so that determination of the direction of two-dimensional code failed.

For example, in case of the direction 0 of the two-dimensional code as shown in FIG. 8A, the finder pattern which is on the right side of the reference pattern F0 (i.e. at an area 0 of FIG. 13) is F1 and the finder pattern which is below the reference pattern F0 (i.e. at an area 1 of FIG. 13) is F2. When two finder patterns F1 and F2 are at an area which is a combination of areas 0 and 1, it can be determined that the direction of two-dimensional code is the direction 0 shown in FIG. 8A. However, if a combination of the finder patterns F1 and F2 which are located at areas 0 and 2 which are shown as an box "–" in FIG. 14 is detected, then it is determined that the direction of the two-dimensional code can not be identified, so that reading of the two-dimension code is terminated.

The relationship between the directions of the two-dimensional code and the areas at which the center coordinates of the finder patterns F1 and F2 are located is shown in FIG. 15. FIG. 15 is a relational view showing the relationship between the directions of the two-dimensional code shown in FIGS. 8A, 8B, 8C and 8D and areas at which the coordinate positions of the centers of the finder patterns F1 and F2 are located. In case of the direction 0 of the two-dimensional code as shown in FIG. 15, the coordinate positions of the centers of the finder patterns F1 and F2 are located at areas 0 and 1, respectively.

In the present embodiment, a determination of the direction of the two-dimensional code when the two-dimensional code is not inclined is made based upon the relationship of the direction of the two dimensional code and the areas at which the coordinate positions of the centers of the finder pattern F1 and F2 are located. The present invention is not limited to only this case, as described above. By using similar method, a determination can be made whether the direction of the two-dimensional code is rotated based upon the coordinate positions of the centers of the finder patterns F0, F1 and F2 even if the two-dimensional code is inclined.

Now, a process for detecting the position of the alignment pattern at step S003 in FIG. 5 will be described in detail. An example of a flow of the process for conducting the detection of the position of the alignment pattern is shown in the flow chart of FIG. 16.

The rotational angle of the two-dimensional code is detected (step S301). It is detected how much angle at which the two-dimensional code is rotated by using the coordinate positions of the centers F0C, F1C, F2C of the finder patterns F0, F1, F2 respectively which are determined by the above-mentioned process.

Figure 17:
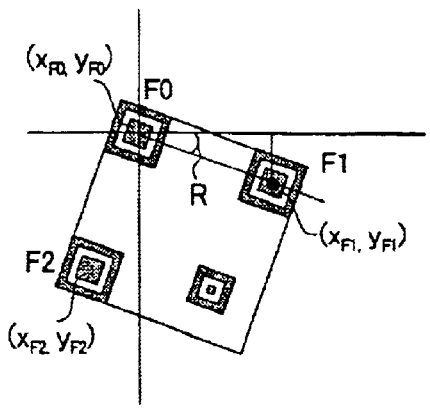
FIG. 17 is a schematic view showing an example of the rotational angle of the two-dimensional code in a horizontal or vertical direction.

The rotational angle is defined as rotational angle R at which the finder pattern F1 is rotated clockwise from the horizontal or vertical direction around the center of the reference finder pattern F0 of the two-dimensional code as shown in FIG. 17 when the relationship between the direction (orientation) of the two-dimensional code and areas has been determined as shown in FIG. 15. As exemplarily shown in FIG. 17, if the rotational angle R is 0° in case of direction 0 in which the coordinate position of the center of the finder pattern F1 of the two-dimensional code is located at area 0 in FIG. 15, the reference pattern F0 and the finder pattern F1 are located in a horizontal position, so that the two-dimensional code is not angularly rotated like direction 0 as shown in FIG. 8A.

FIG. 17 is a schematic view showing an example of the rotational angle of the two-dimensional code from the horizontal or vertical direction. A case of direction 0 shown in FIG. 15 in which the coordinate position of the center of the finder pattern F1 of the two-dimensional code is located at area 0 is illustrated. In this case, the rotational angle R is the angle at which the coordinate position of the center of the finder pattern F1 is rotated from the horizontal and left direction with respect to the finder pattern F0. If the coordinate position of the center of the finder pattern F1 of the two-dimensional code is located at area 1, 2 or 3 in FIG. 15, it indicates that the coordinate position of the center of the finder pattern F1 is rotated by the rotational angle R from the vertically lower direction, horizontally right direction or vertically upper direction.

As to the rotational angle R, clockwise and anti-clockwise rotation is represented as positive and negative value, respectively. Detection of the rotational angle R of the two-dimensional code at a resolution of 5 degrees is conducted in the range of ±45° (i.e. in the range of any of areas 0, 1, 2 and 3 shown in FIG. 13 corresponding to directions 0, 1, 2, 3 of the two-dimensional code respectively).

There is preliminarily prepared a table having 10 tan $R_i$ for rotational angle $R_i$ radian (radian=360°×($R_i$/2π) having a resolution of 5°
wherein $R_i=(\pi/36) \times i$ (i=0, 1, 2, . . . , 9).

If the coordinate positions of the centers F0C, F1C and F2C of the finder patterns F0, F1 and F2, which are detected in the input image of the two-dimensional code are represented as $(x_{F0}, y_{F0})$, $(x_{F1}, y_{F1})$ and $(x_{F2}, y_{F2})$, respectively, tan R (the rotational angle of the two-dimensional code) when the two-dimensional code is not inclined is represented as follows:

In case of direction 0, $$\tan(R) = (y_{F1} - y_{F0})/(x_{F1} - x_{F0}) \quad (14)$$

In case of direction 1, $$\tan(R) = (y_{F0} - y_{F2})/(x_{F0} - x_{F2}) \quad (15)$$

In case of direction 2, $$\tan(R) = (y_{F0} - y_{F1})/(x_{F2} - x_{F1}) \quad (16)$$

In case of direction 3, $$\tan(R) = (y_{F2} - y_{F0})/(x_{F2} - x_{F0}) \quad (17)$$

The tan (R) can be determined from the coordinates of the centers F0C, F1C and F2C of the finder patterns F0, F1 and F2 and the direction of two-dimensional code by using any of the expressions (14) through (17). The rotational angle R can be determined by comparing the determined tan (R) with the values of tan $R_i$ on the predetermined table.

Subsequently, a retrieval reference point is determined upon which the range of the retrieval for extracting an alignment pattern corresponding to the inclination of two-dimensional code is examined as shown in flow chart of FIG. 16.

Figure 18:
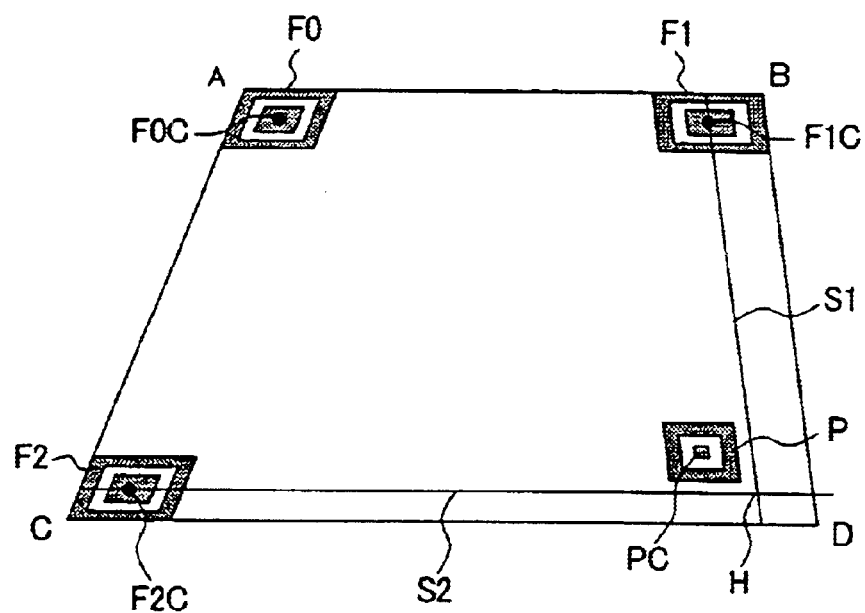
FIG. 18 is a schematic view showing an example of the position of the retrieval reference point of the alignment pattern in the two-dimensional code.

The centers of three finder patterns F0, F1 and F2 are represented as F0C, F1C and F2C, respectively, as shown in FIG. 18. The apexes of two-dimensional code is represented as A, B, C and D, respectively. Three finder patterns F0, F1 and F2 are disposed at three apexes, A, B, and C, respectively. FIG. 18 is a schematic view showing an example of the position of the retrieval reference point for retrieving the alignment pattern in the two-dimensional code.

The retrieval reference point for retrieving the alignment pattern P is represented as H in FIG. 18. The retrieval reference point H is an intersection at which a line S1 which passes through the center F1C of the finder pattern F1 and is parallel with the side BD insects with a line S2 which passes through the center F2C of the finder pattern F2 and is parallel with the side CD.

Figure 19A:
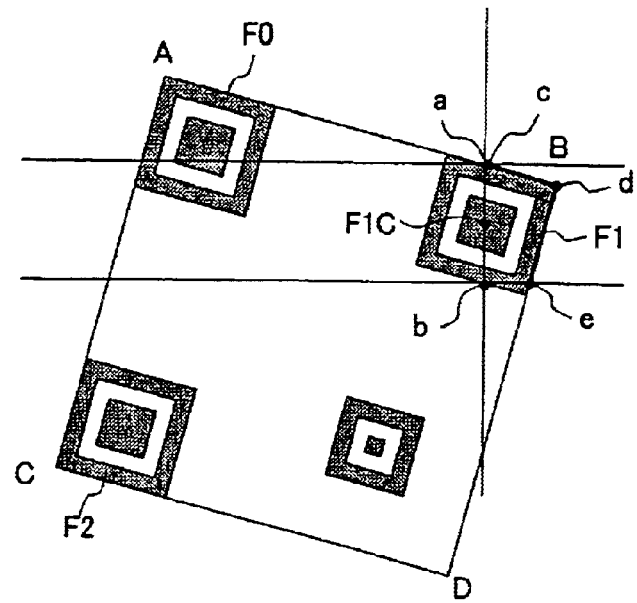
FIGS. 19A and 19B are schematic views showing an example of tracking of the edge of the finder pattern.
Figure 19B:
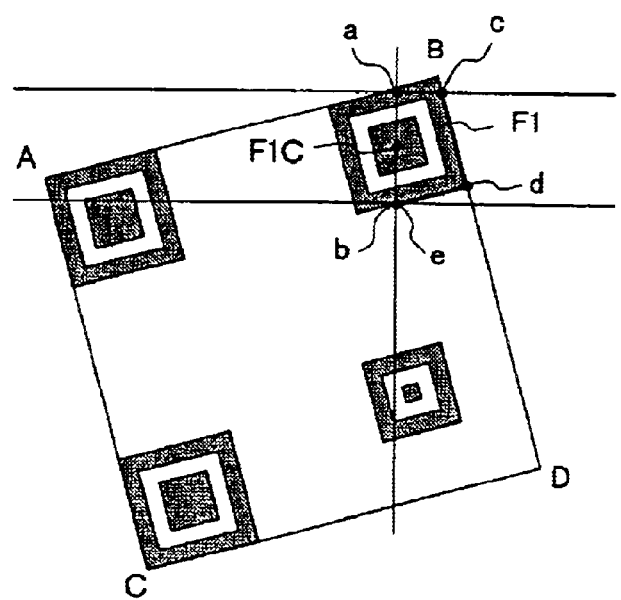

In order to determine the retrieval reference point H, it is necessary to determine the inclination of the side BD, i.e. line BD and that of the side CD, i.e. line CD. The inclinations of the lines BD and CD can be calculated by tracking the edge of the finder pattern which is disposed in contact with lines BD and CD. FIGS. 19A and 19B are schematic views showing an example of the edge tracking of the finder pattern.

In order to detect the positions of pixels on the outer contour of the finder pattern F1 which is in contact with the line BD which is one side of the two-dimensional code and forms part of the line BD as shown in FIGS. 19A and 19B, points a and b at the opposite ends of the finder pattern F1C are determined by conducting scanning from the center F1 of the finder pattern F1 in a vertical direction. The point a is a final point of the second run along which black pixels are consecutive when scanning is conducted in a vertical upward direction from the center F1C of the finder pattern F1 and the point b is a final point of second run along which black pixels are consecutive in a vertical downward direction.

Subsequently, scanning is sequentially conducted in a horizontal and right direction from each point on a segment line ab which is a vertical line. The point of the black pixels at the opposite upper and lower ends at which the runs of consecutive black pixels terminate which is located at the right end of the finder pattern F1 and the point of black pixels at the rightmost end at which the run of the consecutive black pixel terminates, which is located at the right end of the finder pattern F1 are tracked on each point on the segment line ab.

Such an edge tracking allows the tracking termination point c of the black pixels at the upper end corresponding to point a and the tracking terminate point e of the black pixels at the lower end corresponding to point b to be detected for recording. The coordinate point of the tracking final point d at which the point of the rightmost end at which the run of the consecutive black pixels terminates, which is located at the right end of the finder pattern F1 in scanning on each point on the segment line ab, that is, x coordinate (horizontal coordinate) becomes a maximum is recorded.

If the two-dimensional code is rotated clockwise i.e. in a positive direction, the inclination of the segment line de is that of the line BD. If it is rotated anticlockwise i.e. in a negative direction, the inclination of the segment line cd is that of the line BD.

FIGS. 19A and 19B show the cases in which the two-dimensional code is rotated clockwise i.e. in a positive direction and anticlockwise i.e. in a negative direction, respectively. If the two-dimensional code is rotated clockwise i.e. in a positive direction, the tracking start point a matches the tracking terminate point c as shown in FIG. 19A. If it is rotated anticlockwise i.e. in a negative direction, the tracking start point b matches the tracking terminate point e as shown in FIG. 19B.

If the two-dimensional code is rotated clockwise, i.e. in a positive direction, then the inclination of the line BD, part of which is formed by the outer contour of the finder pattern F1 can be determined from the inclination of the outer contour of the finder pattern F1 which is defined by the coordinate positions of the tracking start and terminal points d and e, respectively. On the other hand, if the two-dimensional code is rotated anticlockwise, i.e. in a negative direction, then the inclination of the line BD, part of which is formed by the outer contour of the finder pattern F1 can be determined from the inclination of the outer contour of the finder pattern F1 which is defined by the coordinate points of the tracking start and terminal points c and d, respectively.

In other words, the inclination of the side BD, or the line BD can be determined by detecting the coordinate positions of at least two pixels among those of the pixels which form the outer contour of the finder pattern F1 constituting part of the side BD of the two-dimensional code at which the finder pattern F1 is located.

Similarly, the inclination of the side CD, or line CD at which the finder pattern F2 is located can be also determined.

If the inclinations of two lines BD and CD are calculated as shown in FIG. 18, then the intersection of a straight line S1 passing through the center F1 of the finder pattern F1 and parallel with the line BD and a straight line S2 passing through the center F2 of the finder pattern F2 and parallel with the line CD can be determined by calculation. In such a manner, the intersection of the straight lines S1 and S2 can be determined as the retrieval reference point H, with reference to which the alignment pattern P is retrieved.

The example of the process for calculating the retrieval reference point H for retrieving the alignment pattern which in FIG. 18 has been described with reference to a case in which the finder pattern F1 is located at area 0 and the finder pattern F2 is located at area 1, that is, the two-dimensional code is oriented in a direction 0 is explained. Also in case the two dimensional code is oriented in a direction other than direction 0, the inclination of the side of the two-dimensional code can be detected by similar processing. In this case, the tracking terminate points c, e and d of the runs of consecutive black pixel which is located at the end of the finder pattern are tracked for detection as to the finder pattern constituting part of the side of the two-dimensional code, so that the inclination of the outer contour of the finder pattern is determined. Similarly to the case of direction 0, the retrieval reference point H as to the alignment pattern P can be determined irrespective of the fact that the two-dimensional code is rotated in either direction.

Figure 16:
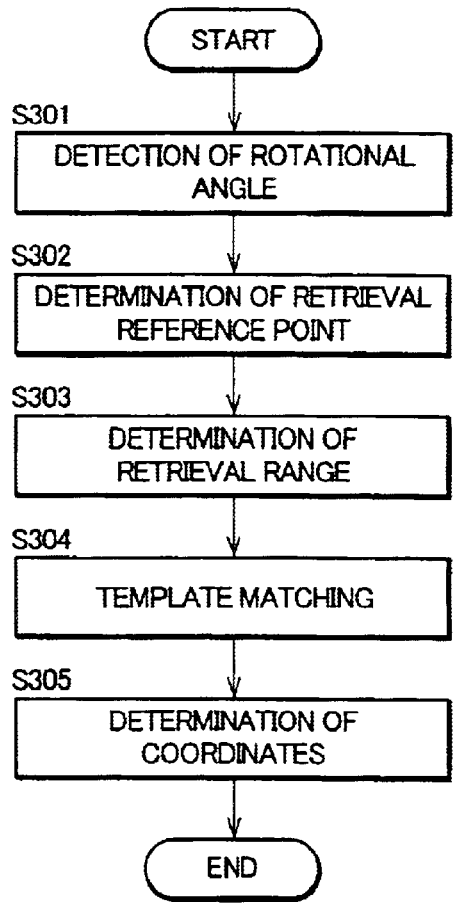
FIG. 16 is a flowchart showing an example of the processing flow for conducting the detection of the position of the alignment pattern.
Figure 20:
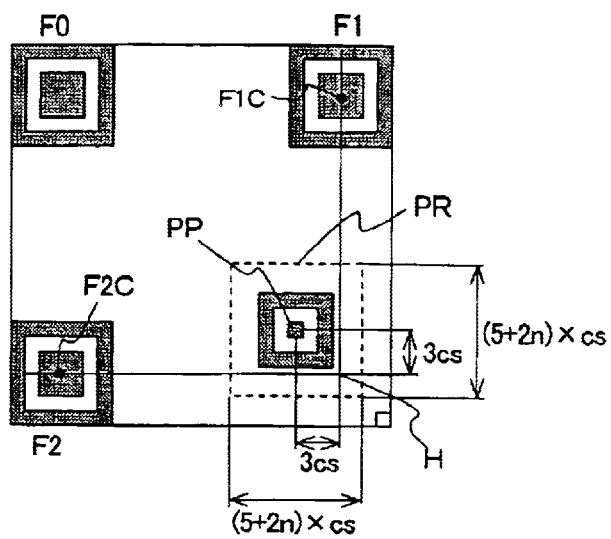
FIG. 20 is a schematic view explaining an example for determining the retrieval range of the alignment pattern P.

The range of the retrieval of the alignment pattern P is determined as shown in flowchart of FIG. 16 (step S303). An example of the retrieval range of the alignment pattern P will be described with reference to FIG. 20. FIG. 20 is a schematic view explaining a case in which the range of the retrieval of the alignment pattern P is determined.

In FIG. 20, the coordinates of the retrieval reference point H for retrieving the alignment pattern are represented as $(x_H, y_H)$ and the cell size is represented as cs.

If the two-dimensional code is not rotated, then the predicted central coordinate position PP at which the center of the alignment pattern P is expected to exist is remote from the retrieval reference point H by a predetermined distance. For example, the predicted central coordinate position PP is located inward from the retrieval reference point by a distance of three cell sizes, i.e. at $(x_H-3cs, y_H-3cs)$. In such a manner, the retrieval range PR of the alignment pattern P is preset in such a manner that it covers sufficiently the alignment pattern P (5 by 5 cell size) around the predicted central coordinate position PP. For example, the rectangular range of widths having a margin of at least two cells in both horizontal and vertical directions $(5+2n) \times cs$ (n denotes an integer) is preset as the retrieval range PR.

In other words, the retrieval range PR is preset so that it sufficiently covers the alignment pattern P with a margin of at least 2 cell size from the predicted central coordinate position PP at which the center of the alignment pattern P is predicted to exist and which is determined as being remote from the retrieval reference point H by a predetermined distance (for example, a distance of three cell size).

If the two-dimensional code is rotated by the rotational angle R as shown in FIG. 17, the corrected retrieval reference point H' in which the rotation of the two-dimensional code is corrected for the retrieval reference point H is calculated by the following expression (18).

$$\begin{pmatrix} x_{H'} \\ y_{H'} \end{pmatrix} = \begin{pmatrix} \cos(-R) & \sin(-R) \\ -\sin(-R) & \cos(-R) \end{pmatrix} \begin{pmatrix} x_H - x_{FO} \\ y_H - y_{FO} \end{pmatrix} + \begin{pmatrix} x_{FO} \\ y_{FO} \end{pmatrix} \quad (18)$$

wherein $(x_{FO}, y_{FO})$ denotes the coordinates of the center F0C of the finder pattern F0.

The corrected predicted central coordinate PP' of the alignment pattern P using the corrected retrieval reference point H' in which the rotation of the angle R has been corrected are represented as follows:

$(x_{H'}-3cs, y_{H'}-3cs)$

Accordingly, the corrected retrieval range PR' of the alignment pattern P involving the rotation is an area at which the retrieval range PR is rotated by the rotational angle R around the corrected predicted central coordinate PP'.

The range which sufficiently covers the alignment pattern P (5 by 5 cell size), for example, the range within the rectangular shape having a width $(5 \times 2n) \times cs$ (n denotes an integer) is preset as the corrected retrieval range PR'.

If the coordinates of the pixels, the rotation of which has been corrected in the corrected retrieval range PR' are represented as (x', y'), the coordinates (x, y) of the input image before the rotation correction corresponding to the coordinates (x', y'), the rotation of which has been corrected can be determined by the expression (19). This enables a partial image, the rotation of which within only the retrieval range PR of the alignment pattern P has been corrected to be formed.

$$\begin{pmatrix} x \\ y \end{pmatrix} = \begin{pmatrix} \cos(R) & \sin(R) \\ -\sin(R) & \cos(R) \end{pmatrix} \begin{pmatrix} x' - x_{FO} \\ y' - y_{FO} \end{pmatrix} + \begin{pmatrix} x_{FO} \\ y_{FO} \end{pmatrix} \quad (19)$$

wherein $(x_{FO}, y_{FO})$ denotes the coordinates of the center F0C of the finder pattern F0.

A partial image within the retrieval range PR in the original image is cut out from the original image if the rotation is not detected. A partial image within the corrected retrieval range PR', the rotation of which has been corrected is cut out if the rotation is detected. A pattern matching a second pattern specific to the alignment pattern P (a specific second pattern which has been preliminarily determined as a pattern different from a first pattern specific to the finder pattern) will be extracted from any of partial images which are to be cut out.

When a process for extracting the alignment pattern P is conducted in the present invention, template matching using a template which matches the features of the second pattern specific to the alignment pattern P is carried out for the cut out partial image. The input image which has not been subjected to binarization process (original image signal) is used as input image used for template matching. Even if the binarization process causes crushing of white pixels or chipping of black pixels as is in the case in which the quality of input image is not so good, use of the input image which has not been subjected to the binarization makes it possible to correctly detect the alignment pattern P.

The template used for the template matching has the shape matching that of 5 by 5 cell alignment pattern to be retrieved and has a size which is a multiplication based upon the cell size. If it is assumed that the input image (original image signal) prior to binarization assumes various level values in the range of 255 to 0 depending upon the change from light (white) to dark (black), 0 and 255 is assigned to the black and white pixels of the template, respectively.

In order to easily enable the template matching to be conducted, partial image within the corrected retrieval range PR' after being subjected to correction of rotation is used if the two-dimensional code is rotated as mentioned above.

Template matching is conducted in which summation of absolute values of differences between the pixel values of all the pixels forming the template and the pixel values of pixels in the partial image corresponding thereto is calculated by sequentially shifting by one pixel within the partial image cut out from the retrieval range PR or PR' (step S304 shown in FIG. 16).

The coordinates of the center of the template in which the summation of the absolute values of the differences which is obtained by sequentially shifting by one pixel over all pixels within the partial image cut out from the retrieval range PR or PR' becomes minimum is determined as the coordinates of the center PC or PC' of the alignment pattern P or P' (the center P or PC' of the alignment pattern P or P' if rotation is involved or not, respectively) (step S305).

If correction of the rotation has been conducted, the coordinates of the center PC of the alignment pattern P in the input image prior to the rotation correction are calculated by further rotating the rotated image which has been determined as the coordinates of the center PC' of the alignment pattern P' according to expression (19). Even if the two-dimensional code of the input image is rotated or inclined, or the image quality is not good, the coordinate position of the center C of the alignment pattern P can be positively detected based upon the coordinate positions of the detected finder patterns F0, F1 and F2.

Now, a determination of the version which is conduced at step S004 in FIG. 5 will be described in detail.

As to finder patterns F0, F1, F2 having the same shape disposed at three corners of the two-dimensional code which is in the rectangular shape (including square shape), a distance between the centers F0C and F1C of the finder patterns F0 and F1 forming one side of the two-dimensional code and a distance between the centers F0C and F2C of the finder patterns F0 and F2 forming one side of the two-dimensional code are obtained based upon their coordinate positions. The average of the two calculated distances between finder patterns is determined.

Thereafter, the number of cells of the two-dimensional code is calculated by obtaining a quotient which is calculated by dividing the average of the distances between the finder patterns by the cell size which is calculated by a process shown at the step S104 of FIG. 6 which has been described. Thus, it is possible to determine the version of the two-dimensional code which defines the number of cells of the two-dimensional code. In order to prevent reading of the two-dimensional code from failing due to misdetermination of version, the present invention provides a version registration table showing the relevance between the version of the two-dimensional code and the registered number of cells which is determined by the version (the number of cells of the two-dimensional code or that between the finder patterns corresponding to the version).

The number of registered cells which matches or most approximates to the calculated quotient (the number of cells) is selected from the numbers of registered cells which have been preliminarily registered on the version register table by retrieving the version registration table, so that the version corresponding to the selected number of registered cells is determined as the version of the two-dimensional code in the input image. The version numbers on the version registration table are set forth in order of the numbers of the cells of the two-dimensional code, so that the number of the cells of the two-dimensional code increases as the version number increases.

Now, cutting out of data cells which is conducted at step S005 in FIG. 5 will be described. An exemplary flow which is related with the process for cutting out the data cells is illustrated with reference to flowchart of FIG. 21.

A light and dark threshold for discriminating whether the data value of each data cell is light (white) or dark (black) is determined (step S401).

Figure 22:
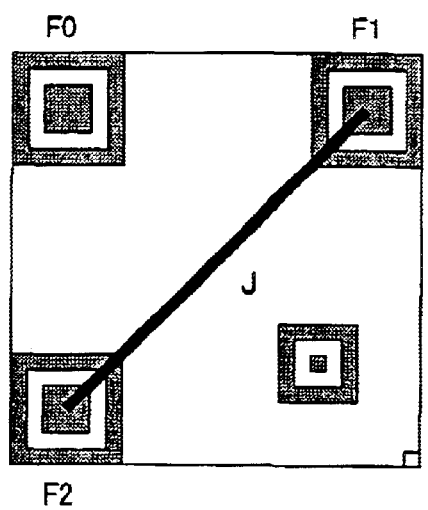
FIG. 22 is a schematic view explaining a method for determining a light and dark threshold for identifying whether the data cell is light or dark (i.e. white and black).

A method of determining the light and dark threshold which identifies whether the data cell-is light or dark (or white or black) will be described with reference to FIG. 22. All pixels of the input image on a diagonal J which is a segment line connecting the centers F1C and F2C of the finder patterns F1 and F2 which are disposed in diagonal positions of the finder patterns F0, F1 and F2 disposed at three corners of the two-dimensional code are scanned for comparing the pixel values of all pixels on the diagonal J, so that a maximum and minimum values of the pixel values are determined. Thereafter, an intermediate value (an average) of the maximum and minimum values of the pixel values on the diagonal is determined as a light and dark threshold for discriminating whether the data cell is light or dark. In lieu of setting the light and dark threshold using the pixel values of all the pixels on the diagonal J, an intermediate value between the maximum and minimum values of the density at the coordinate positions of the input image corresponding to the center positions of the all data cells on the diagonal J may be preset as the threshold.

Subsequently, conversion coefficient in coordinate conversion expression for converting the center position of each cell in data cells into coordinate position in input image is calculated (step S402).

When the coordinate position representative of the position of the center of each data cell of the two-dimensional code is represented as (u, v), the coordinate conversion expressions for converting the position of the center of each data cell of the two-dimensional code into the coordinate position (x, y) in the input image is represented by expressions (20) and (21) as follows:

$$x=(b_{00}u+b_{01}v+b_{02})/(u+b_{21}v+b_{22}) \quad (20)$$

$$y=(b_{10}u+b_{11}v+b_{12})/(u+b_{21}v+b_{22}) \quad (21)$$

The conversion coefficient $b_{ij}$ (wherein ij=00, 01, 02, 10, 11, 12, 21, 22) is calculated by putting the coordinate positions of four determined reference points, i.e. the coordinate positions of the center positions of the cells representing the positions of centers of the finder patterns F0, F1, F2 and the alignment pattern P into expressions (20) and (21).

Figure 23:
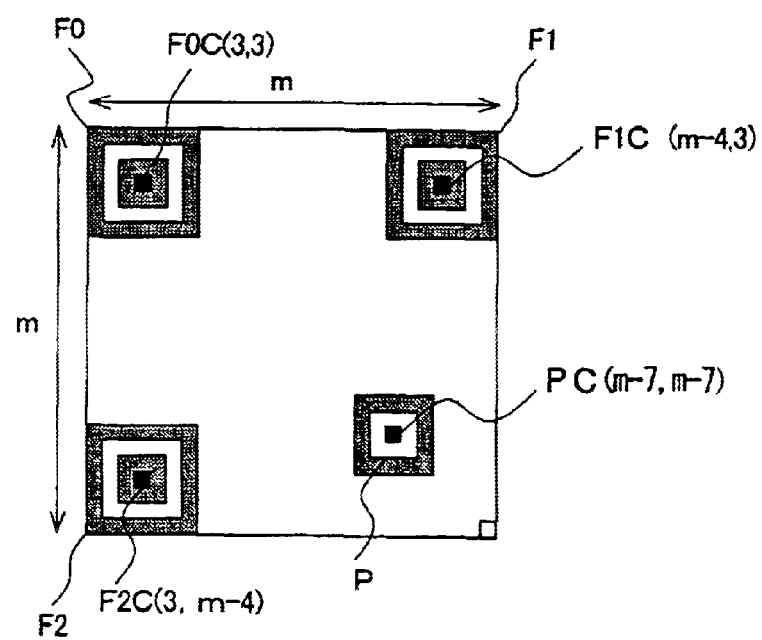
FIG. 23 is a schematic view showing the relation between the shape of the two-dimensional code and the cell position in four reference points.

As mentioned above, the number of cells m×m which constitutes the two-dimensional code has been determined from the version number which was determined at step S004. If the cells of the two-dimensional code is configured as m×m in the input image, the coordinate positions (u, v) representing the centers F0C, F1C, F2C and PC of the finder patterns F0, F1, F2 and the alignment pattern P are represented as (3, 3), (m−4, 3), (3, m−4), (m−7, m−7) wherein the upper and left corner of the two-dimensional code is assumed as the origin of the cell coordinates, respectively, as shown in FIG. 23. FIG. 23 is a schematic view showing the relationship between the shape of the two-dimensional code and the positions of the cells of four reference points.

If the coordinate position (u, v) representing the respective cell center positions corresponding to the coordinate positions $(x_{F0}, y_{F0})$, $(x_{F1}, y_{F1})$ and $(x_{F2}, y_{F2})$ of the centers of the finder patterns F0, F1 and F2 in the input image and the coordinate position $(x_p, y_p)$ of the center PC of the alignment pattern P in the input image into the expressions (20) and (21), following relationships are established.

$$x_{F0}=(b_{00}3+b_{01}3+b_{02})/(3+b_{21}3+b_{22}) \quad (22)$$

$$y_{F0}=(b_{10}3+b_{11}3+b_{12})/(3+b_{21}3+b_{22}) \quad (23)$$

$$x_{F1}=(b_{00}(m-4)+b_{01}3+b_{02})/((m-4)+b_{21}3+b_{22}) \quad (24)$$

$$y_{F1}=(b_{10}(m-4)+b_{11}3+b_{12})/((m-4)+b_{21}3+b_{22}) \quad (25)$$

$$x_{F2}=(b_{00}3+b_{01}(m-4)+b_{02})/(3+b_{21}(m-4)+b_{22}) \quad (26)$$

$$y_{F2}=(b_{10}3+b_{11}(m-4)+b_{12})/(3+b_{21}(m-4)+b_{22}) \quad (27)$$

$$x_p=(b_{00}(m-7)+b_{01}(m-7)+b_{02})/((m-7)+b_{21}(m-7)+b_{22}) \quad (28)$$

$$y_p=(b_{10}(m-7)+b_{11}(m-7)+b_{12})/((m-7)+b_{21}(m-7)+b_{22}) \quad (29)$$

Eight conversion coefficients $b_{ij}$ (ij=00, 01, 02, 10, 11, 12, 21, 22) for converting the position of the center of each data cell into the coordinate positions in the input image can be determined by solving 8 simultaneous equations represented as expressions (22) through (29).

Figure 21:
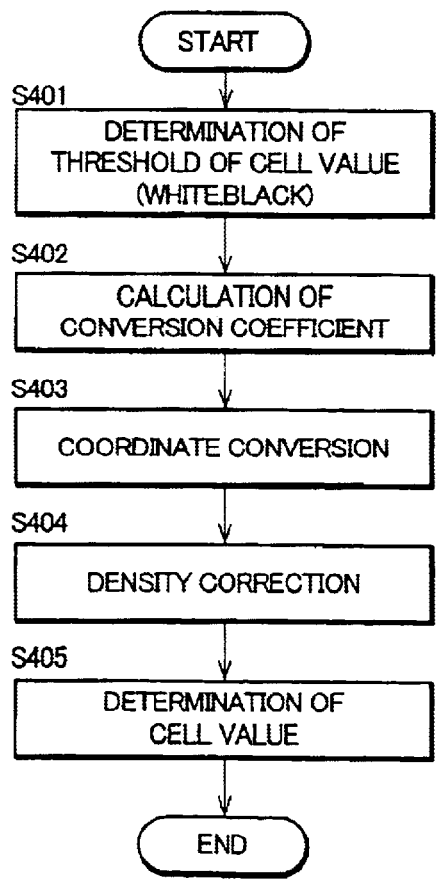
FIG. 21 is a flowchart showing an example of the flow which is related with cutting out processing of data cells.

Subsequently, the position of the center of each data cell in the two-dimensional code is converted into coordinate position in the input image by using the coordinate conversion expressions, i.e. expressions (20) and (21) in which the conversion coefficients $b_{ij}$ are calculated in flowchart of FIG. 21 (step S403).

If the coordinate position of the input image corresponding to the position of the center of each data cell which was converted at step S403 matches the position of the pixel in the input image, the pixel value of matched pixel can be used as density for determining the data value of the data cell without conducting any process. Since the coordinate position of the input image corresponding to the position of the center of each data cell may be located between the pixels of the input image, the data value of the data cell is determined (step S405) by conducting the correction for the density for determining the data value of the data cell (step S404).

The density correction can be conducted by linear interpolating the pixel values of four peripheral pixels which are adjacent to the coordinate position in interest.

Figure 24:
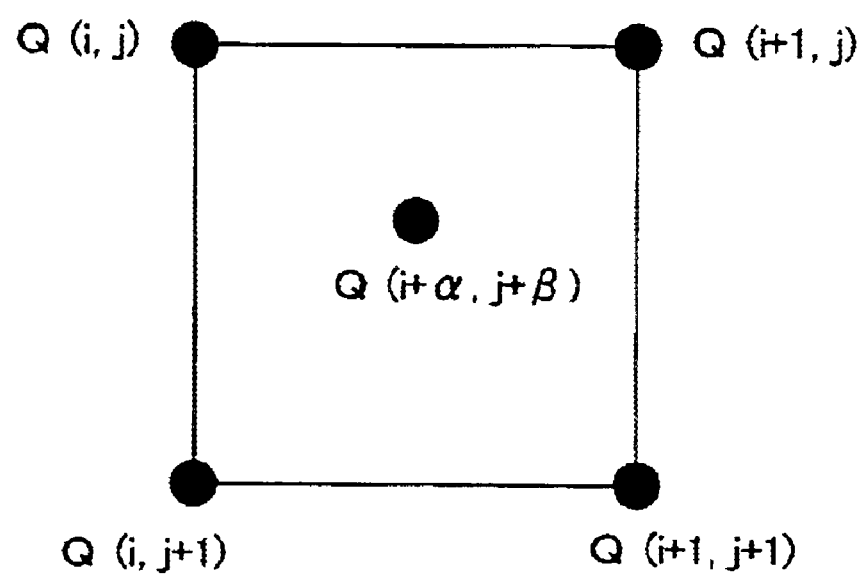
FIG. 24 is a schematic view showing an example of linear interpolation using the pixel values of four adjacent pixels.

A method of linear interpolation will be described with reference to FIG. 24 showing an exemplary linear interpolation using pixel values of four adjacent pixels as follows:

The pixel value of the pixel Q (i+α, j+β) at the coordinates (i+α, j+β) corresponding to the cell position is represented by the following expression (30) wherein i, j denote an integer corresponding to the position of the pixel in input image; α, β denote a relative value representative of the position in which the position of the center of each data cell exists in the area enclosed by a pixel (i, j) having a pixel value Q(i, j), a pixel (i+1, j) having a pixel value Q(i+1, j), a pixel (i, j+1) having a pixel value Q(i, j+1) and a pixel (i+1, j+1) having a pixel value Q(i+1, j+1) and a value representative of the position from a pixel (i, j) in a horizontal and vertical directions and is in the range of 0<α<1 and 0<β<1.

If the coordinate position of the input image corresponding to the position of the center of each data cell is located between the pixels in the input image, the density for determining the data value of the data cell can be obtained by conducting linear interpolation using the expression (30) as follows:

$$Q(i+\alpha, j+\beta)=Q(i,j)\cdot(1-\alpha)\cdot(1-\beta)+Q(i+1,j)\cdot\alpha\cdot(1-\beta)+Q(i,j+1)\cdot(1-\alpha)\cdot\beta+Q(i+1,j+1)\cdot\alpha\cdot\beta \quad (30)$$

If a pixel in the input image corresponding to the center position of the data cell is present, the pixel value of the corresponding pixel is made as the density for determining the data value of the data cell as mentioned above. If no pixel in the input image corresponding to the center position of the data cell is present, the density which is determined by the density correction using the expression (30) is used for comparison with the light and dark threshold which is determined at step S401 of FIG. 21. It can be determined whether the data value of each data cell of two-dimensional code is light (white) or dark (black), so that the data cells can be cut out.

All data cells in the two-dimensional code can be quickly cut out by repeating such a process without the necessity of conducting a process requiring a great amount of processing capacity like prior art in which the pixel values of all pixels in the input image corresponding to the size of data cells are extracted for the summation of the numbers of the black and white pixels to determine the data values of the data cells.

In accordance with the present invention, no timing pattern is provided unlike the prior art and it is possible to easily and quickly identify the position of each data cell by using four reference points such as the finder patterns F0, F1, F2 and the alignment pattern P in accordance with the coordinate conversion expressions. The data value of data cell in the identified position can be quickly determined by using the density of the coordinate position corresponding to the center position of the cell for positively cutting out all data cells. Thereafter the array of the data values of all cut out data cells, i.e. bit array is converted into information such as character array etc. by decoding it in accordance with a predetermined rule, so that reading of the two-dimensional code can be completed with a processing capacity which is remarkably less than that of prior art. Accordingly, the method of reading two-dimensional code of the present invention is applicable to an intelligent terminal such as portable cellular phone having a built-in camera, the processing capacity of which is not high.

Although embodiments of the present invention have been described with reference to the two-dimensional code reading process for executing steps in the two-dimensional code reading, the present invention may be in the form of a two-dimensional code reading apparatus for executing steps of the two-dimensional code reading process, a digital camera having a built-in two-dimensional code reading apparatus, or a portable terminal having a camera. Alternatively, the present invention may be in the form of two-dimensional code reading program represented by a program code which is capable of executing the above-mentioned process by a computer and a recording medium for recording the two-dimensional code reading program and data thereon. The present invention may be also in the form of communication medium such as the communication network for receiving and transmitting the two-dimensional code reading program or data.

An embodiment of the recording medium on which a program or data for executing the two-dimensional code reading process of the present invention is stored will be described. The recording medium may include CD-ROM (-R/-RW), opto-magnetic disc, DVD-ROM, FD, flash memory, memory card, memory stick and other various ROM and RAM and the like. Implementation of the present process is made easier by recording a program for causing a computer to execute the two-dimensional code reading process of the above-mentioned various embodiments of the present invention on these media for distribution. The two dimensional code reading process of the present invention can be carried out by mounting the above-mentioned recording medium on an information processing device such as computer and the like for reading the program thereon, or by storing the program on the recording medium which the information processing device comprises and reading it if needed.

The present invention makes it possible to detect the finder patterns and the alignment pattern of the two-dimensional code at a high precision from the input image, the resolution and the quality of which is not good and which contains noise. The finder patterns can be correctly detected by evaluating the runs of black and white cells of the two-dimensional code in a horizontal and vertical directions as well as in an inclined direction on detection of the finder patterns in the two-dimensional code even if the two-dimensional code is rotated in the input image from a horizontal direction. Since the alignment pattern is extracted by conducting the rotation correction if it is determined based upon the coordinate positions of the finder patterns that the two-dimensional code is rotated, the alignment pattern can be positively detected even if the two-dimensional code is rotated.

Since cutting out of the data cells of the two-dimensional code is enabled by detecting only the positions of four reference points such as three finder patterns and one alignment pattern of the two-dimensional code, it is possible to omit the processing for detecting the timing pattern as is done in the prior art and the processing capacity which is necessary for the whole of the reading operation can be saved.

The retrieval range in which the alignment pattern may exist can be precisely determined by determining the inclination of the two-dimensional code from the coordinate positions of the finder patterns even if the two-dimensional code is distorted from the rectangle shape (including square shape). Unlike the prior art in which the retrieval range can not be precisely identified, the processing capacity which is necessary to precisely examine the position of the alignment pattern can be remarkably reduced as a result, so that the processing capacity which is necessary for the reading of the whole of the two-dimensional code can be saved.

Since there is provided a version registration table showing the correspondence between the version of the two-dimensional code and the number of cells, it is possible to conduct reading operation again after changing by one the version which is determined based upon the version registration table even if the version which has been determined based upon the finder patterns which are detected from the two-dimensional code in the input image is erroneous. Failure of reading of the two-dimensional code due to an error in version determination can be suppressed to a minimum.

Thus, the two-dimensional code can be quickly read at a high precision by applying the method of reading the two-dimensional code of the present invention to an intelligent terminal such as portable cellular phone having a built-in camera and comparatively less processing capacity.

What is claimed is:

1. A two-dimensional code reading apparatus for reading from an input image a two-dimensional code which is representative of various items of information by arranging in two-dimensional form data cells, each recording binary data thereon, said two-dimensional code comprising finder patterns, each having a specific first pattern, which are disposed in a plurality of predetermined positions within said two-dimensional code for identifying the position of said two-dimensional code within said input image, and an alignment pattern which is disposed in a predetermined position different from those of the finder patterns within said two-dimensional code, said alignment pattern having a second pattern which is different from the first pattern specific to said finder patterns, wherein processing for detecting the positions of said plurality of finder patterns which are disposed in the plurality of predetermined positions from said input image is conducted based upon a result of scanning of said input image in a plurality of directions; processing for detecting the position of said alignment pattern is conducted based upon the detected finder patterns; processing for determining a version of said two-dimensional code which defines the number of cells constituting said two-dimensional code is conducted based upon said detected finder patterns; processing for cutting out the data cells which define the data value of each of the data cells constituting said two-dimensional code is conducted based upon the positions of said detected finder patterns and said alignment pattern and said version which is determined by said version determining process; and processing for decoding to identify the information of said two-dimensional code is conducted in accordance with a predetermined rule from the data values of the data cells which are determined by said data cell cutting out processing.

2. The two-dimensional code reading apparatus as defined in claim 1, wherein:
a plurality of candidates of the finder patterns having a pattern which is approximate to said finder patterns including black and white specific first patterns are extracted from said input image as candidate finder patterns;
a constitutional ratio of the black and white patterns along a scanning line across each candidate finder pattern in three directions is detected for each of said plurality of extracted candidate finder patterns;
the detected constitutional ratio of the black and white pattern in each direction is compared with that of said specific first pattern including black and white patterns which is predetermined as said finder pattern to calculate an evaluation value representative of an approximation between the candidate pattern and said first pattern; and
a predetermined number of said candidate finder patterns are selected from among said extracted plurality of candidate finder patterns in order from the candidate finder pattern having greater proximity which is represented by said evaluation value, so that respective positions of the predetermined number of selected finder patterns are detected.

3. The two-dimensional code reading apparatus as defined in claim 2, wherein if said evaluation value representative of the approximation between said candidate finder pattern and said first pattern specific to said finder pattern in any of horizontal, vertical and inclined directions of said extracted plurality of candidate finder patterns is calculated as a value exceeding a predetermined threshold so that the candidate pattern is not approximate to said first pattern, said candidate finder pattern is excluded from among the candidates of said finder patterns.

4. The two-dimensional code reading apparatus as defined in claim 3, wherein said threshold can be preliminarily preset to a desired value by a user depending upon type and application of said two-dimensional code and quality of input image.

5. The two-dimensional code reading apparatus as defined in claim 3, wherein said threshold can be preliminarily preset to a desired value by a user depending upon type and application of said two-dimensional code or quality of input image.

6. The two-dimensional code reading apparatus as defined in claim 2, wherein if said extracted candidate finder patterns are superposed, said superposed candidate finder patterns are unified, and said evaluation values of respective candidate finder patterns prior to unification are summed so that the sum is represented as the evaluation value of the unified candidate finder patterns.

7. The two-dimensional code reading apparatus as defined in claim 2, wherein if the difference between a width representative of the size of said extracted candidate finder patterns and a predetermined specific width representative of the size of said finder pattern in any of the horizontal, vertical and inclined directions exceeds a predetermined acceptable value, said candidate finder pattern is excluded from among the candidates of said finder patterns.

8. The two-dimensional code reading apparatus as defined in claim 7, wherein said acceptable value can be preliminarily set to a desired value by a user depending upon type and application of said two-dimensional code and quality of input image.

9. The two-dimensional code reading apparatus as defined in claim 7, wherein said acceptable value can be preliminarily set to a desired value by a user depending upon the type and application of said two-dimensional code or quality of input image.

10. The two-dimensional code reading apparatus as defined in claim 2, wherein an average of the widths of said finder pattern in three directions, such as horizontal, vertical and inclined, is used as the width representative of the size of the detected finder pattern.

11. The two-dimensional code reading apparatus as defined claim 1, wherein a cell size representative of the dimensions of the cells constituting said two-dimensional code is determined based upon a width representative of the size of the detected finder pattern.

12. The two-dimensional code reading apparatus as defined claim 1, wherein the version of said two-dimensional code is determined by calculating the number of cells which constitutes said two-dimensional code based upon the spacing between said detected plurality of finder patterns and the cell size representative of the dimensions of the cells derived from the width representative of the size of said finder pattern.

13. The two-dimensional code reading apparatus as defined in claim 12, wherein said apparatus comprises a version registration table showing the correspondence between the version of the two-dimensional code and the number of the registered cell constituting the two-dimensional code which is determined by the version and that said version registration table is retrieved based upon the calculated number of cells, whereby the number of said registered cells having matched or approximate value and the version corresponding to said number of registered cells is determined as the number of cells which constitute the two-dimensional code and the version of said two-dimensional code, respectively.

14. The two-dimensional code reading apparatus as defined in claim 1, wherein a determination whether or not the orientation of the two-dimensional code is angularly rotated in the input image is made based upon respective coordinates of the detected plurality of finder patterns and if the orientation of the two-dimensional code is rotated, then the rotational angle of the two-dimensional code is calculated.

15. The two-dimensional code reading apparatus as defined claim 1, wherein the presence of the inclination of each side of said two-dimensional code in the input image is detected by detecting the presence of the inclination of said finder patterns in said input image, in that a retrieval reference point with reference to which the range of the retrieval for retrieving said alignment pattern in said input image is designated is determined from the inclination of each side and the coordinates of the centers of said finder patterns, and in that partial image in the retrieval range which is located in predetermined position from the determined retrieval reference point is cut out from said input image and in that the position of said alignment pattern is detected by extracting said alignment pattern comprising said second pattern from said part of the image.

16. The two-dimensional code reading apparatus as defined in claim 15, wherein the presence of the inclination of said finder pattern is detected by detecting the coordinates of at least two pixels among the coordinates of the pixels which form part of the side of said two-dimensional code on which said finder pattern is located and form the outer contour of said finder pattern by scanning the pixels of said finder pattern.

17. The two-dimensional code reading apparatus as defined in claim 15, wherein a point of intersection of a straight line passing through the coordinates of the center of said finder pattern forming part of the side of said two-dimensional code and parallel with said side of said two-dimensional code and a straight line passing through the coordinates of the center of the other finder pattern which is diagonally opposite to said finder pattern within said two-dimensional code and forms part of the other side of said two-dimensional code and is parallel with said other side is determined as said retrieval reference point, with reference to which said retrieval range for retrieving said alignment pattern is specified.

18. The two-dimensional code reading apparatus as defined in claim 15, wherein said retrieval range is an area which is so wide to include said second pattern specific to said alignment pattern with a margin of at least two-cell size from an estimated central coordinates at which the location of center of said alignment pattern is estimated as being remote from said retrieval reference point by a predetermined distance.

19. The two-dimensional code reading apparatus as defined in claim 15, wherein there is provided a template which matches a feature of each pixel which said second pattern specific to said alignment pattern and in that said alignment pattern comprising said second pattern is extracted from said partial image by conducting template matching between said template and said partial image while shifting by one pixel.

20. The two-dimensional code reading apparatus as defined in claim 19, wherein if the orientation of said two-dimensional code is angularly rotated in said input image, partial image within said retrieval range which is specified by applying the coordinates of said retrieval reference point to the rotational correction based upon the angle at which said orientation of said two-dimensional code is rotated is cut out from said input image and in that after applying the rotation correction for the cut out partial image based upon said rotational angle, the position of said alignment pattern is detected by conducting said template matching while shifting said rotation corrected partial image by one pixel for extracting said alignment pattern.

21. The two-dimensional code reading apparatus as defined in claim 19, wherein said partial image which is to be processed for said template matching is the partial image which is cut out from said input image which is under a condition prior to binary processing.

22. The two-dimensional code reading apparatus as defined in claim 21, wherein when processing for said template matching is conducted, the sum of the absolute values of difference between the pixel value of the pixels of said template and the pixel value of corresponding pixels of said partial image is calculated while sequentially shifting said partial image by one pixel, whereby the position within said partial image in which the sum of absolute values becomes a minimum is determined as the coordinates of said alignment pattern.

23. The two-dimensional code reading apparatus as defined in any of claim 1, wherein when processing for cutting out said data cells to determine the data value of each data cell which forms said two-dimensional code is conducted, conversion coefficients of coordinate conversion expressions for converting the position of the center of each data cell of said two-dimensional code into the coordinates in said input image based upon the cell positions of the centers of said finder patterns and said alignment pattern, which are detected by a position identifying process of said data cell and based upon the number of cells of said two-dimensional code which is determined by the identified version, in that the center position of each data cell is converted into the coordinates of said input image by using said coordinate conversion expressions to which the calculated conversion coefficients are applied for identifying the coordinates corresponding to the center position of each data cell, and in that a data value of each data cell is determined based upon the density of the coordinate position which is identified by said position identifying process for conducting cutting out of each data cell.

24. The two-dimensional code reading apparatus as defined in claim 23, wherein when a process for cutting out said data cells to determine the data value of each data cell which forms said two-dimensional code, the density of said input image at coordinates corresponding to the position of the center of the data cell which is identified by said position identifying process is the density which is obtained from the pixel value of the pixel existing at said coordinates if a pixel exists at the coordinates in said input image corresponding to the position of the center of the identified data cell and it is the density which is obtained by interpolation of pixel values of peripheral pixels adjacent to said coordinates if a pixel does not exist at the coordinates in said input image corresponding to the position of the center of the identified data cell, and in that the data value of each data cell is determined by comparing said density of the input image at the coordinates corresponding to the position of the center of each data cell with a light and dark threshold for identifying the data value of each data cell.

25. The two-dimensional code reading apparatus as defined in claim 24, wherein said light and dark threshold for identifying the data value of each data cell is set based upon the pixel values of the pixels in said input image which are located along the diagonal of said two-dimensional code.

26. The two-dimensional code reading apparatus as defined in claim 25, wherein said light and dark threshold is set to an intermediate value between the maximum and minimum of pixel values of all pixels in said input image which are located along the diagonal of said two-dimensional code.

27. The two-dimensional code reading apparatus as defined in claim 1, wherein if cutting out of said data cells is not properly conducted so that reading of said two-dimensional code fails, a process for cutting out said data cells is repeated again after changing by one version which is determined by said version determining step.

28. A portable terminal which is built in a camera comprising the two-dimensional code reading apparatus as defined in claim 1.

29. A digital camera comprising the two-dimensional code reading apparatus as defined in claim 1.

30. A two-dimensional code reading process for reading from an input image a two-dimensional code which is representative of various items of information by arranging in two-dimensional for data cells, each recording binary data thereon, said two-dimensional code comprising finder patterns, each having a specific first pattern, which are disposed in a plurality of predetermined positions within said two-dimensional code for identifying the position of said two-dimensional code within said input image, and an alignment pattern which is disposed in a predetermined position different from those of the finder patterns within said two-dimensional code, said alignment pattern having a second pattern which is different from the first pattern specific to said finder patterns, wherein processing for detecting the positions of said plurality of finder patterns which are disposed in the plurality of predetermined positions from said input image is conducted based upon a result of scanning of said input image in a plurality of directions; processing for detecting the position of said alignment pattern is conducted based upon the detected said finder patterns; processing for determining a version of said two-dimensional code which defines the number of cells constituting said two-dimensional code is conducted based upon said detected finder patterns; processing for cutting out the data cells which define a data value of each of the data cells constituting said two-dimensional code is conducted based upon the positions of said detected finder patterns and said alignment pattern and said version which is determined by said version determining process; and processing for decoding to identify the information of said two-dimensional code is conducted in accordance with a predetermined rule from the data values of the data cells which are determined by said data cell cutting out processing.

31. The two-dimensional code reading process as defined in claim 30, wherein a plurality of candidates of the finder patterns having a pattern which is approximate to said finder patterns comprising said black and white specific first patterns are extracted from said input image as candidate finder patterns, in that the constitutional ratio of the black and white patterns along a scanning line across each candidate finder pattern in three directions is detected for each of said plurality of extracted candidate finder patterns, in that the detected constitutional ratio of the black and white pattern in each direction is compared with that of said specific first pattern comprising black and white patterns which is predetermined as said finder pattern to calculate an evaluation value representative of the approximation between the candidate pattern and said first pattern, and in that a predetermined number of said candidate finder patterns are selected from among said extracted plurality of candidate finder patterns in order from the candidate finder pattern having higher proximity which is represented by said evaluation value, so that respective positions of the predetermined number of selected finder patterns are detected.

32. The two-dimensional code reading process as defined in claim 30, wherein the version of said two-dimensional code is determined by calculating the number of cells which constitute said two-dimensional code based upon the spacing between said detected plurality of finder patterns and the cell size representative of the dimensions of the cells derived from the width representative of the size of said finder pattern.

33. The two-dimensional code reading process as defined in claim 30, wherein the presence of the inclination of each side of said two-dimensional code in the input image is detected by detecting the presence of the inclination of said finder patterns in said input image, in that a retrieval reference point with reference to which the range of the retrieval for retrieving said alignment pattern in said input image is designated is determined from the inclination of each side and the coordinates of the centers of said finder patterns, and in that partial image in the retrieval range which is located in predetermined position from the determined retrieval reference point is cut out from said input image and in that the position of said alignment pattern is detected by extracting said alignment pattern comprising said second pattern from said part of the image.

34. The two-dimensional code reading process as defined in claim 33, wherein there is provided a template which matches a feature of each pixel which said second pattern specific to said alignment pattern and in that said alignment pattern comprising said second pattern is extracted from said partial image by conducting template matching between said template and said partial image while shifting by one pixel.

35. The two-dimensional code reading process as defined in claim 34, wherein if the orientation of said two-dimensional code is angularly rotated in said input image, partial image within said retrieval range which is specified by applying the coordinates of said retrieval reference point to the rotational correction based upon the angle at which said orientation of said two-dimensional code is rotated is cut out from said input image and in that after applying the rotation correction for the cut out partial image based upon said rotational angle, the position of said alignment pattern is detected by conducting said template matching while shifting said rotation corrected partial image by one pixel for extracting said alignment pattern.

36. The two-dimensional code reading process as defined in claim 34, wherein said partial image which is to be processed for said template matching is the partial image which is cut out from said input image which is under a condition prior to binarization processing.

37. The two-dimensional code reading process as defined in claim 34, wherein when processing is conducted for cutting out said data cells to determine the data value of each data cell which forms said two-dimensional code, conversion coefficients of coordinate conversion expressions for converting the position of the center of each data cell of said two-dimensional code into the coordinates in said input image based upon the cell positions of the centers of said finder patterns and said alignment pattern, which are detected at a step of identifying the position of said data cell and based upon the number of cells of said two-dimensional code which is determined by the identified version, wherein the center position of each data cell is converted into the coordinates of said input image by using said coordinate conversion expressions to which the calculated conversion coefficients are applied for identifying the coordinates corresponding to the position of the center of each data cell, and wherein a data value of each data cell is determined based upon the density of the coordinate position which is identified by said position identifying process for conducting cutting out of each data cell.

38. The two-dimensional code reading process as defined in claim 37, wherein when a process for cutting out said data cells to determine the data value of each data cell which forms said two-dimensional code, the density of said input image at coordinates corresponding to the position of the center of the data cell which is identified by said position identifying process is the density which is obtained from the pixel value of the pixel existing at said coordinates if a pixel exists at the coordinates in said input image corresponding to the position of the center of the identified data cell and it is the density which is obtained by interpolation of pixel values of peripheral pixels adjacent to said coordinates if a pixel does not exist at the coordinates in said input image corresponding to the position of the center of the identified data cell, and wherein the data value of each data cell is determined by comparing said density of the input image at the coordinates corresponding to the position of the center of each data cell with a light and dark threshold for identifying the data value of each data cell.

39. The two-dimensional code reading process as defined in claim 38, wherein said light and dark threshold for identifying the data value of each data cell is set based upon the pixel values of the pixels in said input image which are located along the diagonal of said two-dimensional code.

40. A program for reading two-dimensional code which is described in program code and which is capable of causing a computer to execute a process of reading the two-dimensional code as defined in claim 30.

41. A recording medium which is readable by a computer and on which the two-dimensional code reading program as defined in claim 40 is recorded.

* * * * *